US 9,986,343 B2

(12) United States Patent
Haber et al.

(10) Patent No.: US 9,986,343 B2
(45) Date of Patent: May 29, 2018

(54) APPARATUS AND METHODS FOR INDIVIDUAL ADDRESSING AND NOISE REDUCTION IN ACTUATOR ARRAYS

(71) Applicant: AUDIO PIXELS LTD., Rehovot OT (IL)

(72) Inventors: Eric Andreas Haber, Kibbutz Kfar Menahem (IL); Daniel Lewin, Ramat Hasharon (IL); Shay Kaplan, Givat Ela (IL); Meir Ben Simon, Givat Ela (IL); Yuval Cohen, Rehovot (IL)

(73) Assignee: AUDIO PIXELS LTD., Rehovot (IL)

( * ) Notice: Subject to any disclaimer, the term of this patent is extended or adjusted under 35 U.S.C. 154(b) by 5 days.

(21) Appl. No.: 15/209,894

(22) Filed: Jul. 14, 2016

(65) Prior Publication Data
US 2017/0013368 A1 Jan. 12, 2017

Related U.S. Application Data

(63) Continuation of application No. 13/989,979, filed as application No. PCT/IL2011/050018 on Nov. 17, 2011, now Pat. No. 9,425,708.
(Continued)

(51) Int. Cl.
*H04R 3/06* (2006.01)
*H04R 19/02* (2006.01)
(Continued)

(52) U.S. Cl.
CPC ............. *H04R 19/02* (2013.01); *H02N 1/006* (2013.01); *H04R 1/403* (2013.01); *H04R 3/06* (2013.01); *H04R 3/12* (2013.01); *Y10T 29/49117* (2015.01)

(58) Field of Classification Search
CPC ............. H04R 19/02; H04R 3/12; H04R 3/06
(Continued)

(56) References Cited

U.S. PATENT DOCUMENTS 4,131,363 A 12/1978 Shea et al.
4,194,095 A 3/1980 Doi et al.
(Continued)

FOREIGN PATENT DOCUMENTS

EP 0437999 A2 7/1991
EP 1206160 A1 11/2000
(Continued)

OTHER PUBLICATIONS

Lagorce L. K. et al "Magnetic and Mechanical Properties of Micro-machined Strontium Ferrite/Polyimide Composites", IEEE Journal of Micro-electromechanical Systems, 6(4) Dec. 1997.
(Continued)

*Primary Examiner* — Antony M Paul
(74) *Attorney, Agent, or Firm* — Browdy and Neimark, PLLC

(57) ABSTRACT

Apparatus for generating a target physical effect, at least one attribute of which corresponds to at least one characteristic of a digital input signal sampled periodically, the apparatus comprising a multiplicity of electrostatic actuator elements, each comprising a moving element moving between first and second electrodes, the multiplicity of electrostatic actuator elements including Nr first subsets (R-subsets) of actuator elements and Nc second subsets (C-subsets) of actuator elements, wherein a first partitioning of the multiplicity of actuator elements yields the Nr first subsets (R-subsets) and a second partitioning of the multiplicity of actuator elements yields the Nc second subsets (C-subsets); a first plurality of Nr electrical connections (R-wires) interconnecting the moving elements of actuator elements in each R-subset,
(Continued)

such that the moving element of any actuator element in each individual R-subset is electrically connected to the moving elements of all other actuator elements in the individual R-subset, and electrically isolated from the moving elements of all actuator elements not in the individual R-subset; a second plurality of Nc electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset; a third plurality of Nc electrical connections (B-wires) interconnecting the second electrodes of actuator elements in each C-subset, such that the second electrode of any actuator element in each individual C-subset is electrically connected to the second electrode of all other actuator elements in the individual C-subset, and electrically isolated from all actuator elements not in the individual C-subset; and a controller electrically.

12 Claims, 29 Drawing Sheets

Related U.S. Application Data

(60) Provisional application No. 61/417,298, filed on Nov. 26, 2010, provisional application No. 61/468,916, filed on Mar. 29, 2011.

(51) Int. Cl.
  *H04R 1/40* (2006.01)
  *H02N 1/00* (2006.01)
  *H04R 3/12* (2006.01)

(58) Field of Classification Search
  USPC ... 381/97, 98, 176, 190, 332, 334, 337, 396, 381/398, 412, 116, 191; 310/309, 311, 310/322, 323.06; 181/143, 199, 202; 307/91, 143; 335/93, 155, 23, 25; 369/79, 80; 359/200.6; 361/207, 271; 376/113; 337/12, 14, 115, 299; 345/85; 318/671
  See application file for complete search history.

(56) References Cited

U.S. PATENT DOCUMENTS

| | | | |
|---|---|---|---|
| 4,337,379 A | 6/1982 | Nakaya | |
| 4,515,997 A | 5/1985 | Stinger, Jr. | |
| 5,517,570 A | 5/1996 | Taylor | |
| 5,574,792 A | 11/1996 | Konno | |
| 5,580,639 A | 12/1996 | Togawa et al. | |
| 5,953,200 A | 9/1999 | Haley et al. | |
| 6,094,116 A | 7/2000 | Tai et al. | |
| 6,125,189 A | 9/2000 | Yasuno et al. | |
| 6,289,106 B1 | 9/2001 | Wong | |
| 6,373,955 B1 | 4/2002 | Hooley | |
| 6,403,995 B2 | 6/2002 | Thomas | |
| 6,795,561 B1 | 9/2004 | Bank | |
| 6,933,662 B2 * | 8/2005 | Arbogast | H01L 41/094 310/330 |
| 6,959,096 B2 | 10/2005 | De Vries Diemer et al. | |
| 6,963,654 B2 | 11/2005 | Sotme et al. | |
| 6,975,740 B2 | 12/2005 | Rautio et al. | |
| 7,016,186 B2 | 3/2006 | Ueda et al. | |
| 7,286,681 B2 | 10/2007 | Gerkinsmeyer | |
| 8,306,244 B2 * | 11/2012 | Okamura | H04R 1/005 381/111 |
| 2001/0048123 A1 | 12/2001 | Thomas | |
| 2002/0073856 A1 | 6/2002 | Davis et al. | |
| 2002/0106093 A1 | 8/2002 | Azima et al. | |
| 2002/0151171 A1 | 10/2002 | Furusawa | |
| 2003/0068054 A1 | 4/2003 | Sotme et al. | |
| 2003/0129814 A1 | 4/2003 | Mizukoshi | |
| 2004/0122543 A1 | 6/2004 | Lee et al. | |
| 2005/0008171 A1 | 1/2005 | Hosoi et al. | |
| 2005/0207588 A1 | 9/2005 | Biegelsen | |
| 2006/0145059 A1 | 7/2006 | Lee et al. | |
| 2011/0108933 A1 | 5/2011 | Nakatani et al. | |

FOREIGN PATENT DOCUMENTS

| | | |
|---|---|---|
| EP | 1063866 A1 | 12/2000 |
| EP | 1065725 A2 | 1/2001 |
| EP | 1465211 A2 | 10/2004 |
| EP | 1653614 A1 | 5/2006 |
| EP | 2768241 | 8/2014 |
| GB | 2106750 A | 4/1983 |
| GB | 2393601 A | 3/2004 |
| JP | 51120710 A2 | 10/1976 |
| JP | 57023387 A | 2/1982 |
| JP | 57185790 A2 | 11/1982 |
| JP | 05014992 | 1/1993 |
| JP | 09266599 A | 7/1997 |
| JP | 09098092 A2 | 8/1997 |
| JP | 2001016675 A | 1/2001 |
| JP | 2005087929 A | 4/2005 |
| JP | 2010028211 A | 2/2010 |
| NL | 6613713 A | 4/1968 |
| WO | 8400460 A1 | 2/1984 |
| WO | 9631086 A1 | 3/1996 |
| WO | 9824544 A1 | 6/1998 |
| WO | 0123104 A2 | 4/2001 |
| WO | 0187458 A1 | 11/2001 |
| WO | 0217127 A2 | 2/2002 |
| WO | 03017717 A2 | 2/2003 |
| WO | 03059005 A2 | 7/2003 |
| WO | 2007135678 A2 | 11/2007 |
| WO | 2007135680 A1 | 11/2007 |
| WO | 2009066290 A2 | 5/2009 |
| WO | 11111042 A1 | 9/2011 |
| WO | 12070042 A1 | 5/2012 |

OTHER PUBLICATIONS

Lagorce L. K. et al "Magnetic micro actuators based on polymer magnets", IEEE Journal of Micro-electromechanical Systems, 8(1), Mar. 1999.
BBE's DS48 "Digital Speaker Processor" Digital Loudspeaker Management System.
Diamond A M et al. "Digital sound reconstruction using arrays of cmos-mems microspeakers", Transducers, Solid-State Sensors, Actuators and Microsystems, 12th International Conference on, 2003, Piscataway, NJ, US, IEEE, (1) 238-241 (Jun. 9, 2003).
Yamaha "Why have multiple speakers when one unit will do" Multi-Channel Surround Sound From a Single Compenent YSP 1000 (2004).
Hawksford M O J "Smart Digital Loudspeaker Arrays", Journal of the Audio Engineering Society, New York, NY, US, 51 (12) 1133-1162. (Dec. 2003).
Huang Y et al: "Distortion and Directivity in a Digital Transducer Array Loudspeaker", Journal of the Audio Engineering Society, 49 (5) 337-352, XP001178706, ISSN: 1549-4950 (May 2001).
Meyer D G: "Digital Control of Loudspeaker Array Directivity", Journal of the Audio Engineering Society, New York, NY, US, vol. 32,(10) 747-754, XP000763026, ISSN: 1549-4950 (Oct. 1984).
Crocker "Encyclopedia of Acoustics" Wiley-Interscience; vol. 1 : 1-5 (Apr. 22, 1997).
Kinsler et al "Fundamentals of Acoustics" Wiley-Interscience; (4) 1-9.
Raichel "The Science and Applications of Acoustics" Springer. (2) 1-4.
Rossing et al "Principles of Vibration and Sound" Springer-Verlag. 1-4.

(56) References Cited

OTHER PUBLICATIONS

Fahy "Foundations of Engineering Acoustics" 1-9 (Oct. 2003).
Neumann et al "MEMS (Microelctromechanical Systems) Audio Devices—Dreams and Realities". 1-5 (Oct. 2003).
Braun et al "Row/Column Addressing Scheme for Large Electrostatic Actuator MEMS Switch Arrays and Optimization of the Operational Reliability by Statistical Analysis" Journal of Microelectromechanical Systems. 17 (5) (Oct. 2008).
Schreier et al "Understanding Delta-Sigma Data Converters" Wiley-Interscience. IEEE Press 1-455.
Hawksford, "Spatial Distribution of Distortion and Spectrally Shaped Quantization Noise in Digital Micro-Array Loudspeakers" J. Audio Eng. Soc. 55 : 1/2: 1-26 (2007).

* cited by examiner

| Drive scheme | 1 | 2 | 3 | 4 | 5 |
|---|---|---|---|---|---|
| $V_{RS}$ | $\geq V_H$ | $\geq V_H$ | 0 | $\leq -V_H$ | 0 |
| $V_{RU}$ | 0 | 0 | $\leq -V_H$ | 0 | $\geq V_H$ |
| $V_{CR}$ | $\geq V_H$ | $\geq V_H$ | 0 | $\leq -V_H$ | 0 |
| $V_{CL}$ | $\geq V_L + V_{RS}$ | $\geq V_L + V_{RS}$ | $\geq V_L$ | $\leq -(V_L + V_{RS})$ | $\leq -V_L$ |
| $V_{CU}$ | $\geq 2 \times V_{RS}$ | $\geq V_L + V_{RS}$ | $\geq V_L$ | $\leq -(V_L + V_{RS})$ | $\leq -V_L$ |

FIG. 8

| Drive scheme | | 6 | 7 | 8 | 9 | 10 |
|---|---|---|---|---|---|---|
| $V_{RS}$ | Phase 1 | $\geq V_H$ | 0 | 0 | $+V_D$ | 0 |
| | Phase 2 | 0 | $\leq -V_H$ | $-V_D$ | 0 | $-V_D$ |
| $V_{RU}$ | Phase 1 | 0 | $\leq -V_H$ | $-V_D$ | 0 | $-V_D$ |
| | Phase 2 | 0 | $\leq -V_H$ | $-V_D$ | 0 | $-V_D$ |
| $V_{CR}$ | Phase 1 | $\geq V_H$ | 0 | 0 | $+V_D$ | 0 |
| | Phase 2 | $\geq V_H$ | 0 | 0 | $+V_D$ | 0 |
| $V_{CL}$ | Phase 1 | $\geq \max (V_L, 2 \times V_H)$ | $\geq \max (V_L - V_H, V_H)$ | $+V_D$ | $+V_D$ | $+V_D$ |
| | Phase 2 | $\geq \max (V_L, 2 \times V_H)$ | $\geq \max (V_L - V_H, V_H)$ | $+V_D$ | $2 \times V_D$ | $+V_D$ |
| $V_{CU}$ | Phase 1 | $\geq \max (V_L, 2 \times V_H)$ | $\geq \max (V_L - V_H, V_H)$ | $+V_D$ | $2 \times V_D$ | $+V_D$ |
| | Phase 2 | $\geq \max (V_L, 2 \times V_H)$ | $\geq \max (V_L - V_H, V_H)$ | $+V_D$ | $2 \times V_D$ | $+V_D$ |

*FIG. 11*

| Drive scheme | | 11 | 12 | 13 | 14 | 15 | 16 | 17 |
|---|---|---|---|---|---|---|---|---|
| $V_{RS}$ | Phase 1 | 0 | 0 | 0 | 0 | 0 | 0 | 0 |
| | Phase 2 | $-V_D$ | $-V_D$ | $-V_D$ | $-V_D$ | $-V_D$ | $-V_D$ | $-V_D$ |
| $V_{RU}$ | Phase 1 | $-V_D$ | $-V_D$ | $-V_D$ | $-V_D$ | $-V_D$ | $-V_D$ | $-V_D$ |
| | Phase 2 | $-V_D$ | $-V_D$ | $-V_D$ | $-V_D$ | $-V_D$ | $-V_D$ | $-V_D$ |
| $V_{CR}$ | Phase 1 | 0 | 0 | 0 | 0 | 0 | 0 | 0 |
| | Phase 2 | 0 or $+V_D$ | 0 | $+V_D$ | 0 or $+V_D$ | 0 | $+V_D$ | 0 or $+V_D$ |
| $V_{CL}$ | Phase 1 | $+V_D$ | $+V_D$ | $+V_D$ | $+V_D$ | 0 or $+V_D$ | 0 or $+V_D$ | 0 or $+V_D$ |
| | Phase 2 | $+V_D$ | $+V_D$ | $+V_D$ | $+V_D$ | $+V_D$ | $+V_D$ | $+V_D$ |
| $V_{CU}$ | Phase 1 | $+V_D$ | $+V_D$ | $+V_D$ | $+V_D$ | $+V_D$ | $+V_D$ | $+V_D$ |
| | Phase 2 | $+V_D$ | $+V_D$ | $+V_D$ | $+V_D$ | $+V_D$ | $+V_D$ | $+V_D$ |

FIG. 12

1510: Perform initialization procedure as described with reference to Fig.13, leaving some (typically half) of all C-subsets with all their moving elements in the A-position ("full"), and the other C-subsets with all their elements in the B-position ("empty"). The initialization procedure finishes with all R-signals, A-signals and B-signals "off"

↓

1520: Choose a number d (e.g. any arbitrary number) such that there exists an R-subset numbered d.

↓

1530: Choose a number e (e.g. any arbitrary number) such that the C-subsets numbered e is empty.

↓

1540: Choose a number f (e.g. any arbitrary number) such that there exists an R-subset numbered f.

↓

1550: Choose a number g (e.g. any arbitrary number) such that the C-subset numbered g is full.

↓

1560: Initialize internal variable Na to the number of moving elements currently in the A-position

↓

1570: Execute main loop (e.g. as per Fig. 16) once per actuation clock cycle

*FIG. 15*

1610: Compute the difference net_moves between the element selector input signal (representing the number of moving elements that should be in the A-position to produce the desired physical effect) and the actual number of elements in the A-position (internal variable Na)

1620: If net_moves is zero perform method of Fig. 23

1630: If net_moves is positive perform method of Fig. 17

1640: If net_moves is negative perform method of Fig. 18

1650: Return to step 1610 at the next actuation clock cycle

*FIG. 16*

1710: If any A-signal, or any B-signal other than b(e) was "on" during the last actuation clock cycle: see Fig. 23.

↓

1720: If no A-signal, nor any B-signal other than b(e) was "on" during the last actuation clock cycle:

A: Turn b(e) "on", and all other A-signals and B-signals "off".

B: If any R-signal numbered between d and d+net_moves-1 was "on" during the previous actuation clock cycle: perform method of Fig. 18

C: If no R-signal numbered between d and d+net_moves-1 was "on" during the previous actuation clock cycle: perform method of Fig. 19

↓

1730: Increment Na by the number of R-signals that are currently "on"

↓

Jump to step 1650 in main loop (e.g. as per Figure 16)

FIG. 17

1810: Turn "on" any R-signals numbered from d up to and including the lowest-numbered R-signal which was "off" during the previous actuation clock cycle (if any).

↓

1820: Turn all other R-signals "off"

↓

1830: Increment d by the number of R-signals that are currently "on"

↓

Jump to step 1730 in Fig. 17

*FIG. 18*

1910: If d+net_moves > Nr:

A: Turn "on" all R-signals numbered from d up to and including Nr-1.

B: Turn all other R-signals "off"

C: Set d = 0

D: If e = Nc-1, set e=0; otherwise increment e by one

↓

1920: If d+net_moves-1 < Nr:

A: Turn "on" all R-signals numbered from d up to and including d+net_moves-1.

B: Turn all other R-signals "off"

C: Increment d by net_moves.

↓

Jump to step 1730 in Fig. 17

*FIG. 19*

2010: If any B-signal, or any A-signal other than a(g) was "on" during the last actuation clock cycle, perform method of Fig. 23.

↓

2020: If no B-signal, nor any A-signal other than a(g) was "on" during the last actuation clock cycle:

A: Turn A(g) "on", and all other A-signals and B-signals "off".

B: If any R-signal numbered between f and f-net_moves-1 was "on" during the previous actuation clock cycle: perform method of Fig. 21

C: If no R-signal numbered between f and f-net_moves-1 was "on" during the previous actuation clock cycle: perform method of Fig. 22

↓

2030: Decrement Na by the number of R-signals that are currently "on"

↓

Jump to step 1650 in main loop (Figure 16)

*FIG. 20*

2110: Turn "on" any R-signals numbered from f up to and including the lowest-numbered R-signal which was "off" during the previous actuation clock cycle (if any).

↓

2120: Turn "off" all other R-signals

↓

2130: Increment f by the number of R-signals that are currently "on"

↓

Jump to step 2030 in Fig. 20

*FIG. 21*

2210: If f-net_moves > Nr:

A: Turn "on" all R-signals numbered from f up to and including Nr-1.

B: Turn "off" all other R-signals

C: Set f = 0

D: If g = Nc-1, set g=0; else increment g by one

↓

2220: If f-net_moves ≤ Nr:

A: Turn "on" all R-signals numbered from f up to and including f-net_moves-1.

B: Turn "off" all other R-signals

C: Increment f by net_moves.

↓

Jump to step 2030 in Fig. 20

*FIG. 22*

2310: Turn "off" all R-signals

↓

2320: If Na was changed during the previous actuation clock cycle:

A: Keep "on" any A-signal or B-signal to which was "on" during the previous actuation clock cycle.

B: Turn "off" all other A-signals and B-signals

↓

2330: If Na was not changed during the previous actuation clock cycle, turn "off" all A-signals and all B-signals.

↓

Return

*FIG. 23*

|  | A0 | A1 | A2 | A3 | A4 | A5 | A6 | A7 |  |
|---|---|---|---|---|---|---|---|---|---|
| | 00 | 08 | 10 | 18 | 20 | 28 | 30 | 38 | R0 |
| | 01 | 09 | 11 | 19 | 21 | 29 | 31 | 39 | R1 |
| | 02 | 0A | 12 | 1A | 22 | 2A | 32 | 3A | R2 |
| | 03 | 0B | 13 | 1B | 23 | 2B | 33 | 3B | R3 |
| | 04 | 0C | 14 | 1C | 24 | 2C | 34 | 3C | R4 |
| | 05 | 0D | 15 | 1D | 25 | 2D | 35 | 3D | R5 |
| | 06 | 0E | 16 | 1E | 26 | 2E | 36 | 3E | R6 |
| | 07 | 0F | 17 | 1F | 27 | 2F | 37 | 3F | R7 |
|  | B0 | B1 | B2 | B3 | B4 | B5 | B6 | B7 |  |

*Fig. 24*

|  | A'0 | A'6 | A'2 | A'3 | A'4 | A'5 | A'1 | A'7 |  |
|---|---|---|---|---|---|---|---|---|---|
|  | 00 | 08 | 10 | 18 | 20 | 28 | 30 | 38 | R'0 |
|  | 01 | 09 | 11 | 19 | 21 | 29 | 31 | 39 | R'1 |
|  | 02 | 0A | 12 | 1A | 22 | 2A | 32 | 3A | R'2 |
|  | 03 | 0B | 13 | 1B | 23 | 2B | 33 | 3B | R'3 |
|  | 04 | 0C | 14 | 1C | 24 | 2C | 34 | 3C | R'5 |
|  | 05 | 0D | 15 | 1D | 25 | 2D | 35 | 3D | R'4 |
|  | 06 | 0E | 16 | 1E | 26 | 2E | 36 | 3E | R'7 |
|  | 07 | 0F | 17 | 1F | 27 | 2F | 37 | 3F | R'6 |
|  | B'0 | B'6 | B'2 | B'3 | B'4 | B'5 | B'1 | B'7 |  |

APPARATUS AND METHODS FOR INDIVIDUAL ADDRESSING AND NOISE REDUCTION IN ACTUATOR ARRAYS

REFERENCE TO CO-PENDING APPLICATIONS

Priority is claimed from U.S. Provisional Applications No. 61/468,916, entitled "Apparatus and methods for individual addressing and noise reduction in actuator arrays" and filed Mar. 29, 2011 and No. 61/417,298 entitled: "Methods for Individual Addressing and Noise Reduction in Actuator Arrays" filed on Nov. 26, 2010.

Co-pending applications also include the following:

| Country | Serial No. | Title |
| --- | --- | --- |
| USA | 60/802,126 | AN APPARATUS FOR GENERATING PRESSURE |
| USA | 60/907,450 | APPARATUS FOR GENERATING PRESSURE AND METHODS OF MANUFACTURE THEREOF |
| USA | 60/872,488 | VOLUME CONTROL |
| PCT | PCT/IL2007/000622 | APPARATUS AND METHODS FOR GENERATING PRESSURE WAVES |
| USA | 60/924,203 | APPARATUS AND METHODS FOR GENERATING PRESSURE WAVES |
| USA | | IMPROVED MANUFACTURING |
| PCT | PCT/IL2007/000618 | DIRECT DIGITAL SPEAKER APPARATUS HAVING A DESIRED DIRECTIVITY PATTERN |
| PCT | PCT/IL2007/000621 | VOLUME AND TONE CONTROL IN DIRECT DIGITAL SPEAKERS |
| USA | 60/996,513 | IMPROVED SPEAKER APPARATUS AND METHODS USEFUL IN CONJUNCTION THEREWITH |
| USA | 61/136,778 | ACTUATOR APPARATUS WITH COMB-DRIVE COMPONENT AND METHODS USEFUL FOR MANUFACTURING AND OPERATING SAME |
| PCT | PCT/IL2009/000943 | ACTUATOR APPARATUS WITH COMB-DRIVE COMPONENT AND METHODS USEFUL FOR MANUFACTURING AND OPERATING SAME |
| USA | 61/171,946 | DUST PROTECTION APPARATUS FOR FLAT DIGITAL LOUDSPEAKERS |
| USA | 61/476,352 | CORONA DISCHARGE |
| USA | 12/301,954 | VOLUME AND TONE CONTROL IN DIRECT DIGITAL SPEAKERS |
| PCT | PCT/IL2008/001524 | DIGITAL SPEAKER APPARATUS |
| USA | 12/301,951 | APPARATUS AND METHODS FOR GENERATING PRESSURE WAVES |
| USA | 12/601,427 | DIRECT DIGITAL SPEAKER APPARATUS HAVING A DESIRED DIRECTIVITY PATTERN |

FIELD OF THE INVENTION

The present invention relates generally to actuator arrays and more particularly to digital loudspeakers.

BACKGROUND OF THE INVENTION

Conventional technology pertaining to certain embodiments of the present invention is described in the following publications inter alia:

Apparatus and methods for generating pressure waves are known e.g. from co-pending published PCT application WO 2007/135680; digital speaker devices are known e.g. from co-pending published PCT application WO 2009/066290.

Conventional noise shaping also termed sigma-delta modulation and delta-sigma modulation is described in "Understanding Delta-Sigma Data Converters" by Richard Schreier and Gabor C. Temes.

The disclosures of all publications and patent documents mentioned in the specification, and of the publications and patent documents cited therein directly or indirectly, are hereby incorporated by reference.

SUMMARY OF THE INVENTION

The presently disclosed subject matter includes methods and apparatus for generating a physical effect using a multiplicity of electrostatic actuator elements (actuator array) wherein each actuator element includes a first electrode, a second electrode and a moving element, e.g. as described herein with reference to FIGS. 1A-1C, and wherein subsets of first electrodes, subsets of second electrodes, and subsets of moving elements, are electrically interconnected, e.g. as described herein with reference to FIGS. 2 and 3.

Certain aspects of the presently disclosed subject matter are "drive schemes", i.e. methods and apparatus for causing movement of one or more selected moving elements while preventing movement of other (unselected) moving elements, by applying one of a finite, predetermined set of voltages to each electrically interconnected subset of first electrodes, to each electrically interconnected subset of second electrodes, and to each electrically interconnected subset moving elements. According to some aspects of the present invention, the number of different drive voltages employed by a drive scheme, and/or their magnitude, are minimized, thus facilitating cost-effective implementation of the apparatus. According to further aspects of the present invention, the number of opportunities per time unit for initiating movements of moving elements is increased, thus increasing the time resolution of the apparatus, facilitating more accurate generation of the desired physical effect.

A further aspect of the presently disclosed subject matter is "initialization", i.e. a method for bringing all moving elements within the actuator array into a known, useful starting position, using only the drive voltages already employed by a drive scheme (i.e. without requiring additional voltages), e.g. as shown in FIG. 13.

According to still further aspects of the presently disclosed subject matter, an apparatus, e.g. as shown in FIG. 14, including an actuator array and a controller, operates as a type of digital-to-analog converter whose analog output is a physical effect such as, for example, audible sound. The controller may apply drive voltages to each electrically interconnected subset of first electrodes, to each electrically interconnected subset of second electrodes, and to each electrically interconnected subset moving elements synchronously with an actuation clock, whose frequency may differ from the frequency at which a digital input signal to the controller is sampled.

Further aspects of the presently disclosed subject matter are "element selection methods", i.e. methods for bringing the number of moving elements in a particular position or moving in a particular direction during each cycle of an actuation clock, sufficiently close to a desired value to enable accurate production of a desired physical effect, e.g. as shown in FIGS. 15 to 23.

Still further aspects of the presently disclosed subject matter are methods for shaping the frequency spectrum of different types of noise which may occur in the physical effect produced, including: mismatch noise resulting from differences in the magnitude of the physical effect produced by each actuator element, addressing noise resulting from the inability of element selection methods under certain conditions to make the number of moving elements in a particular position or moving in a particular direction exactly equal to a desired value, and quantization noise resulting from the number of actuator elements in said actuator array being less than the number of possible values a digital input signal can assume.

It is appreciated that any or all of the computational steps shown and described herein may be implemented as dedicated electronic circuits, such as for example, in an application specific integrated circuit (ASIC), or using reconfigurable circuits, such as for example, a field programmable gate array (FPGA), or may be implemented in software running on, for example, a microcontroller, digital signal processor (DSP), or other type of microprocessor.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure.

BRIEF DESCRIPTION OF THE DRAWINGS

Certain embodiments of the present invention are illustrated in the following drawings:

FIGS. 8, 11 and 12 are tables useful in understanding certain embodiments of the invention.

FIGS. 15 to 23 are simplified flowchart illustrations of processes together forming an element selection method, operative in accordance with certain embodiments of the invention.

FIGS. 24-26 are simplified representation of an actuator array in various positions, e.g. after a swapping procedure, all in accordance with certain embodiments of the invention

Computational components described and illustrated herein can be implemented in various forms, for example, as hardware circuits such as but not limited to custom VLSI circuits or gate arrays or programmable hardware devices such as but not limited to FPGAs, microcontrollers or digital signal processors (DSPs), or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

DETAILED DESCRIPTION OF CERTAIN EMBODIMENTS

Figure 2:
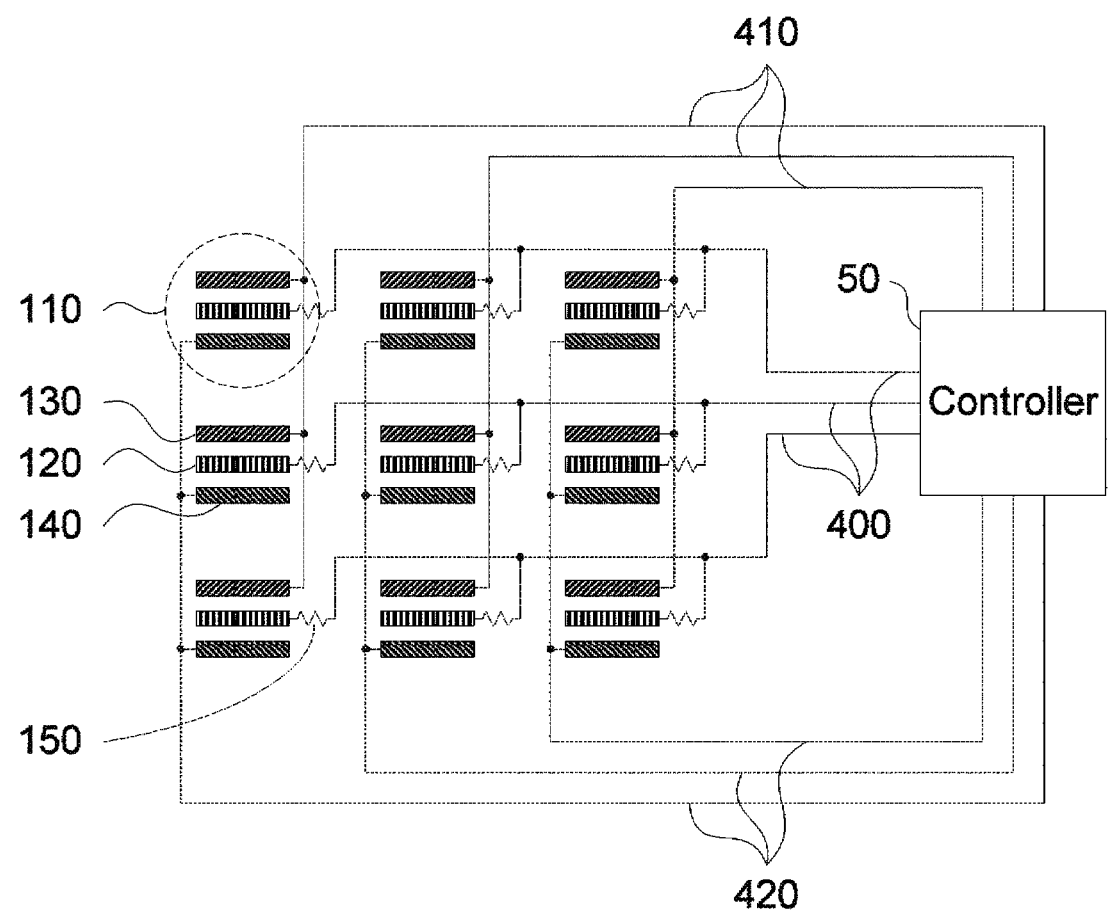
FIGS. 2-4 are simplified schematic diagrams of actuator arrays in accordance with certain embodiments of the invention.

Provided herein, according to certain embodiments of the present invention, e.g. as shown and described herein with reference to FIG. 2, is an apparatus for generating a target physical effect, at least one attribute of which corresponds to at least one characteristic of a digital input signal sampled periodically, the apparatus comprising:

a multiplicity of electrostatic actuator elements, each comprising a moving element moving between first and second electrodes, the multiplicity of electrostatic actuator elements including Nr first subsets (R-subsets) of actuator elements and Nc second subsets (C-subsets) of actuator elements, wherein a first partitioning of the multiplicity of actuator elements yields the Nr first subsets (R-subsets) and a second partitioning of the multiplicity of actuator elements yields the Nc second subsets (C-subsets);

a first plurality of Nr electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset;

a second plurality of Nc electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset;

a third plurality of Nc electrical connections (B-wires) interconnecting the second electrodes of actuator elements in each C-subset, such that the second electrode of any actuator element in each individual C-subset is electrically connected to the second electrode of all other actuator elements in the individual C-subset, and electrically isolated from all actuator elements not in the individual C-subset; and a controller electrically connected to the first, second and third pluralities of electrical connections, operative to receive a digital input signal, and to apply one of a predetermined, finite set of electric potentials to each of the electrical connections respectively, such that resulting movements of the moving elements together produce the desired physical effect.

It is appreciated that R-subsets may have, but need not all have, the same number of elements. The same is true for the C-subsets. R-subsets may or may not intersect with all C-subsets.

According to certain embodiments, e.g. as shown and described herein with reference to FIG. 2, the controller is operative to determine, according to the digital input signal, Nr-tuplets of electrical potential for application to the first plurality of Nr electrical connections (R-wires) respectively, first Nc-tuplets of electrical potential for application to the second plurality of Nc electrical connections (A-wires) respectively, and second Nc-tuplets of electrical potential for application to the third plurality of Nc electrical connections (B-wires) respectively.

Figure 14:
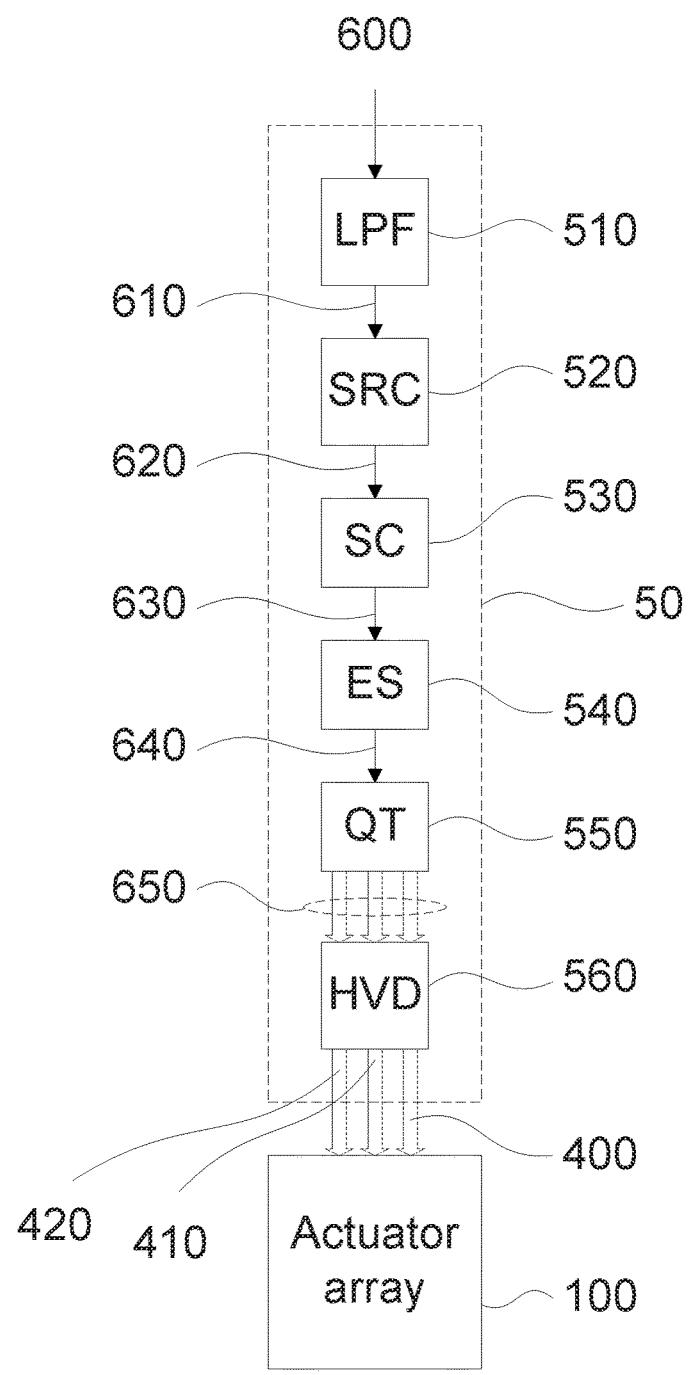
FIG. 14 is a simplified block diagram of a controller and actuator array controlled thereby, constructed and operative in accordance with certain embodiments of the invention.

According to certain embodiments, e.g. as shown and described herein with reference to FIGS. 2 and 14, the Nr-tuplets, first Nc-tuplets and second Nc-tuplets are determined by the controller such that their application to the first, second and third plurality of electrical connections respectively causes the moving elements of the multiplicity of actuator elements to produce a physical effect which corresponds to at least one characteristic of the digital input signal.

Figure 1A:
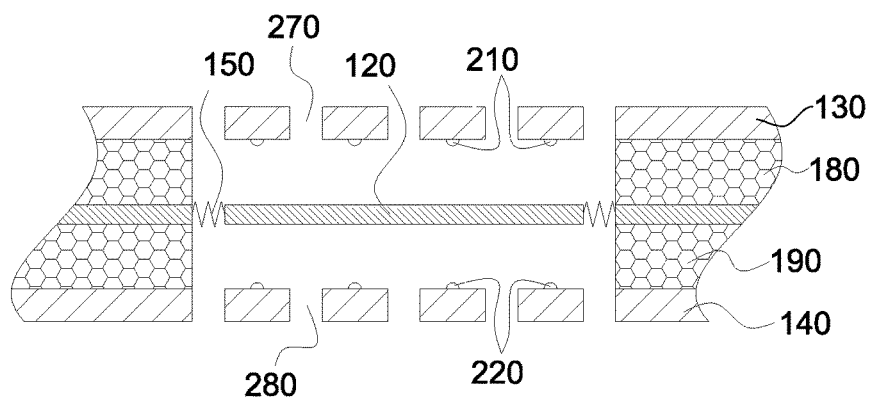
FIGS. 1A to 1C are cross-sectional illustrations of one type of double-sided electrostatic actuator element useful in forming actuator arrays in accordance with certain embodiments of the invention.
Figure 1B:
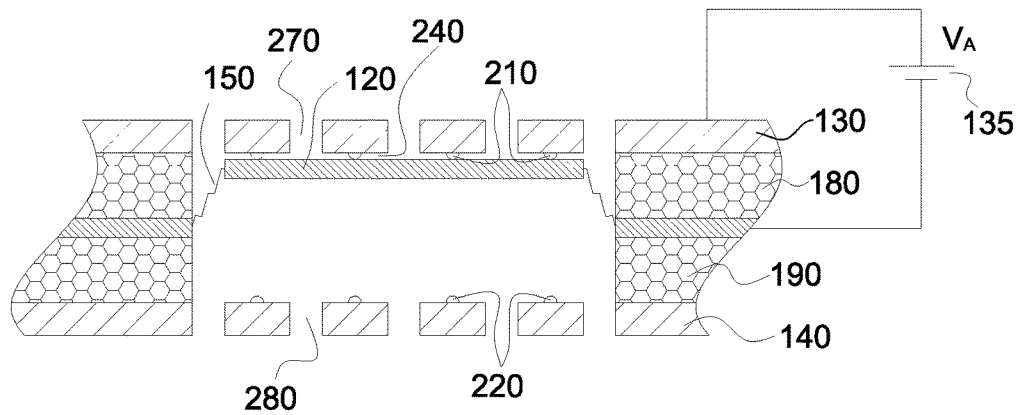
Figure 1C:
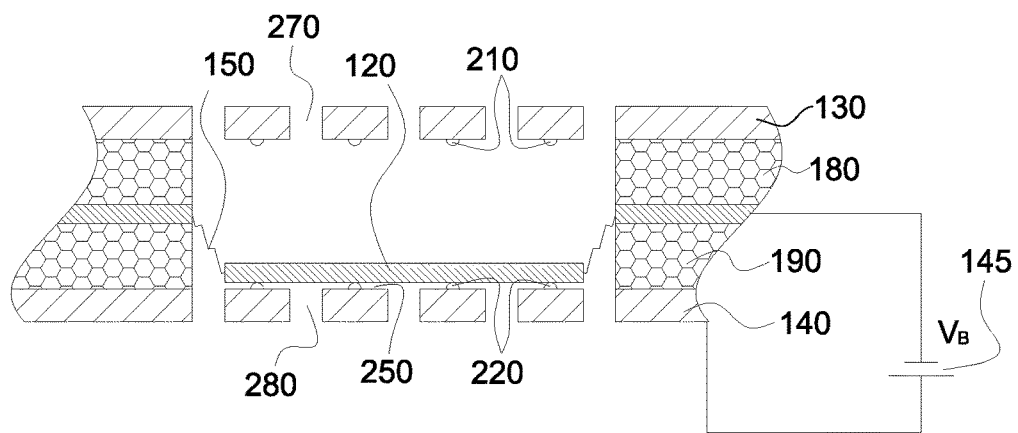

According to certain embodiments, e.g. as shown and described herein with reference to FIG. 1b-1c, each moving element is operative, responsive to potentials applied by the controller, to move from a first extreme position closer to the first electrode than to the second electrode, to a second extreme position closer to the second electrode than to the first electrode, and back.

Figure 3:
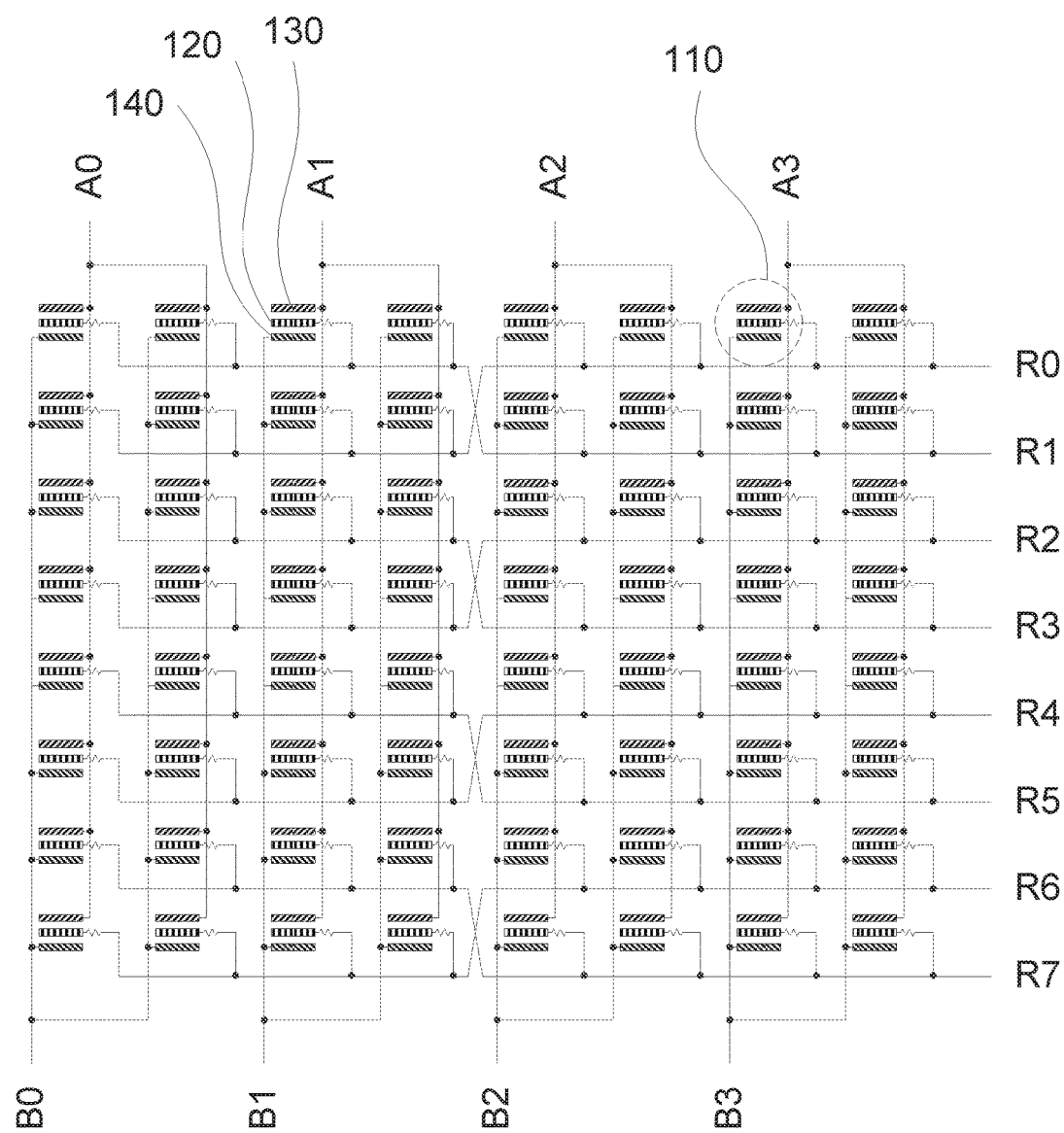

According to certain embodiments, e.g. as shown and described herein with reference to FIG. 2-3, intersections of any individual one of the first subsets of actuator elements and any individual one of the second subsets of actuator elements all include a uniform number of actuator elements (1 or more).

According to certain embodiments, e.g. as shown and described herein with reference to FIGS. 4-8 and 10-12, the predetermined, finite set of electric potentials includes first and second finite sets of electrical potential values, the Nr-tuplets of electrical potentials are selected from the first finite sets of electrical potential values; and the first and second Nc-tuplets of electrical potentials are selected from the second finite sets of electrical potential values. At least one member of the first and second finite sets of electrical potential values may be zero (ground). Each of the first and second finite set of electrical potential values may include a member that is zero (ground). At least one of the first and second finite sets of electrical potential values may have exactly two values. Both of the first and second finite sets of electrical potential values may have exactly two values. At least one of the first and second finite sets of electrical potential values may have exactly three values. At least one member of the first finite set of electrical potential values may equal at least one member of the second finite set of electrical potential values. At least one member of the first finite set of electrical potential values may be twice the value of at least one member of the second finite set of electrical potential values. At least one member of the first finite set of electrical potential values may be equal in magnitude and opposite in polarity, relative to at least one member of the second finite set of electrical potential values.

According to certain embodiments, e.g. as shown and described herein with reference to FIGS. 2 and 14, the controller is operative to periodically apply one of the predetermined, finite sets of electric potentials to each member of the first, second and third pluralities of electrical connections respectively. the controller may be operative to periodically determine, according to the digital input signal, Nr-tuplets of electrical potential for periodic application to the Nr members of the first plurality of electrical connections (R-wires) respectively, first Nc-tuplets of electrical potential for periodic application to the Nc members of the second plurality of electrical connections (A-wires) respectively, and second Nc-tuplets of electrical potential for periodic application to the Nc members of the third plurality of electrical connections (B-wires) respectively. application of the Nr-tuplets, first Nc-tuplets and second Nc-tuplets of electrical potential may be synchronous with an actuation clock, such that an Nr-tuplet of electrical potential is applied to the first plurality of Nr electrical connections (R-wires), a first Nc-tuplet of electrical potential is applied to the second plurality of Nc electrical connections (R-wires), and a second Nc-tuplet of electrical potential is applied to the third plurality of Nc electrical connections (B-wires), periodically and simultaneously, once every actuation clock cycle, for the duration of the actuation clock cycle.

According to certain embodiments, e.g. as shown and described herein with reference to FIG. 1b-1c, each moving element is operative, responsive to the potential applied by the controller, to move from a first extreme position, closer to the first electrode than to the second electrode, to a second extreme position, closer to the second electrode than to the first electrode, and back, and where such movements are completed within a single actuation clock cycle. Each moving element may, e.g. as described herein with reference to FIG. 9, be operative, responsive to the potential applied by the controller, to move from a first extreme position, closer to the first electrode than to the second electrode, to a second extreme position, closer to the second electrode than to the first electrode, and back, and where such movements are completed within k actuation clock cycles, where k is a positive integer, e.g. 2 (FIGS. 9, 10 e.g.) or larger.

According to certain embodiments, e.g. as shown and described herein with reference to FIG. 2, a manufacturing method is provided, for manufacturing apparatus for generating a physical effect, at least one attribute of which corresponds to at least one characteristic of a digital input signal sampled periodically, the method comprising:

providing a multiplicity of electrostatic actuator elements, each comprising a moving element moving between first and second electrodes, the providing including defining:
a first partitioning of the multiplicity of actuator elements into Nr first subsets (R-subsets), and
a second partitioning of the multiplicity of actuator elements into Nc second subsets (C-subsets);
interconnecting the moving elements of actuator elements in each R-subset, via a first plurality of Nr electrical connections (R-wires), such that the moving element of any actuator element in each individual R-subset is electrically connected to the moving elements of all other actuator elements in the individual R-subset, and electrically isolated from the moving elements of all actuator elements not in the individual R-subset;
interconnecting the first electrodes of actuator elements in each C-subset, via a second plurality of Nc electrical connections (A-wires), such that the first electrode of any actuator element in each individual C-subset is electrically connected to the first electrode of all other actuator elements in the individual C-subset, and electrically isolated from all actuator elements not in the individual C-subset;
interconnecting the second electrodes of actuator elements in each C-subset, a third plurality of Nc electrical connections (B-wires), such that the second electrode of any actuator element in each individual C-subset is electrically connected to the second electrode of all other actuator elements in the individual C-subset, and electrically isolated from all actuator elements not in the individual C-subset; and
providing a controller electrically connected to the first, second and third pluralities of electrical connections, operative to receive a digital input signal, and to apply one of a predetermined, finite set of electric potentials to each of the electrical connections respectively, such that resulting movements of the moving elements together produce the desired physical effect.

Figure 10:
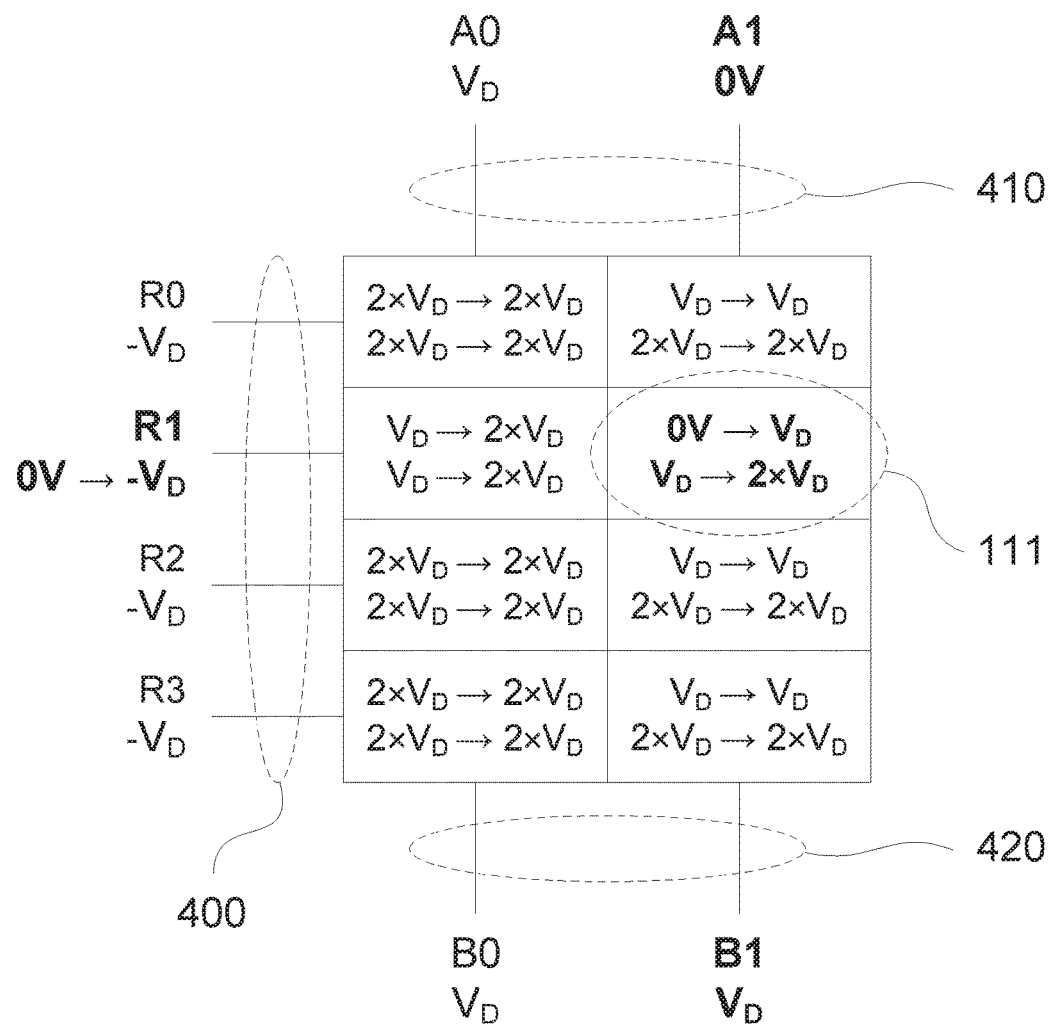
FIG. 10 is a simplified representation of an actuator array constructed and operative in accordance with certain embodiments of the invention.

Each moving element may, e.g. as described herein with reference to FIGS. 10, 24, be operative, responsive to the potential applied by the controller, to move from a first extreme position, closer to the first electrode than to the second electrode, to a second extreme position, closer to the second electrode than to the first electrode, and back, and wherein, during a single actuation clock cycle, some of the multiplicity of moving elements leave one of their extreme positions and do not yet reach the other of their extreme positions and others of the multiplicity of moving elements reach one of their extreme positions having left the other of their extreme positions during an actuation clock cycle previous to the single actuation clock cycle.

According to certain embodiments, e.g. as shown and described herein with reference to FIG. 14, a method is provided for generating a physical effect, at least one attribute of which corresponds to at least one characteristic of a digital input signal sampled periodically, the method comprising:

providing a multiplicity of electrostatic actuator elements, each comprising a moving element moving between first and second electrodes, the multiplicity of electrostatic actuator elements including Nr first subsets (R-subsets) of actuator elements and Nc second subsets (C-subsets) of actuator elements, wherein a first partitioning of the multiplicity of actuator elements yields the Nr first subsets (R-subsets) and a second partitioning of the multiplicity of actuator elements yields the Nc second subsets (C-subsets);
providing a first plurality of Nr electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset;
providing a second plurality of Nc electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset;
providing a third plurality of Nc electrical connections (B-wires) interconnecting the second electrodes of actuator elements in each C-subset, such that the second electrode of any actuator element in each individual C-subset is electrically connected to the second electrode of all other actuator elements in the individual C-subset, and electrically isolated from all actuator elements not in the individual C-subset; and
using a controller, electrically connected to the first, second and third pluralities of electrical connections, to receive a digital input signal, and to apply one of a predetermined, finite set of electric potentials to each of the electrical connections respectively, such that resulting movements of the moving elements together produce the desired physical effect.

The physical effect may be sound defining the following attributes: volume; and pitch; wherein the digital input signal has the following characteristics: amplitude; and frequency; and wherein the digital input signal's amplitude corresponds to the sound's volume and the digital input signal's frequency corresponds to the sound's pitch.

According to certain embodiments, e.g. as shown and described herein with reference to FIG. 16, the moving element is operative, responsive to potentials applied by the controller, to move from a first extreme position, closer to the first electrode than to the second electrode, to a second extreme position, closer to the second electrode than to the first electrode, and back, and wherein, once per actuation clock cycle, the controller is operative for computing a net_moves number characterized in that if, during that individual clock cycle, m1 moving elements are released from the first extreme position and m2 moving elements are released from the second extreme position, and m2−m1=net_moves, the physical effect is produced during the individual clock cycle.

According to certain embodiments, e.g. as shown and described herein with reference to FIGS. 15-23, the controller is additionally operative to determine, once per clock cycle, application-effective electrical potentials which, when applied to the first plurality of Nr electrical connections (R-wires), the second plurality of Nc electrical connections (A-wires), and the third plurality of Nc electrical connections (B-wires) respectively, are operative to effect:

Release of k1 moving elements from the first extreme position

Release of k2 moving elements from the second extreme position such that k1−k2 is close enough to net_moves to produce a physical effect which resembles the target physical effect sufficiently closely for purposes of a given application.

At each actuation clock cycle, the total number of moving elements released from both extreme position may be minimized by releasing zero elements from at least one of the extreme positions.

According to certain embodiments, e.g. as shown and described herein with reference to FIG. 24, at each actuation clock cycle, the total number of moving elements released from both extreme positions is minimized unless a higher total number exists for which k1−k2 is closer to net-moves. Typically, at each actuation clock cycle, If net_moves is positive or zero: k1=2×net_moves and k2=net_moves. Typically, if net_moves is negative: k1=net_moves and k2=2× net_moves.

According to certain embodiments, e.g. as shown and described herein with reference to FIG. 15-23, during a single actuation clock cycle, some of the multiplicity of moving elements leave one of their extreme positions and do not yet reach the other of their extreme positions and others of the multiplicity of moving elements reach one of their extreme positions having left the other of their extreme positions during an actuation clock cycle previous to the single actuation clock cycle and the application-effective electrical potentials are selected by the controller to ensure that any moving elements having been released, previously to the single actuation clock cycle, from one of their extreme positions reach the opposite extreme position during an appropriate clock cycle.

Each moving element may be operative, responsive to the potential applied by the controller, to move from a first extreme position, closer to the first electrode than to the second electrode, to a second extreme position, closer to the second electrode than to the first electrode, and back, and where such movements are completed within k actuation clock cycles, where k is a positive integer.

According to certain embodiments, e.g. as shown and described herein with reference to FIGS. 4-7, 10 and 24:

Each R-subset includes Nc moving elements

Each C-subset includes Nr moving elements

R-wires are numbered, arbitrarily, consecutively, or otherwise, from 0 to Nr−1 thereby to define an ordering thereof. It is appreciated that numbering as used herein does not include any physical marking of any element being numbered.

A-wires and B-wires are numbered, arbitrarily, consecutively, or otherwise, from 0 to Nc−1 thereby to define an ordering thereof Moving elements are numbered such that each moving element has the number: Nr×C-subset number+R-subset number.

The controller may select the application-effective electric potentials such that, at each actuation clock cycle, the numbers of all moving elements currently in the A-position form a continuous wraparound sequence, and the numbers of all moving elements currently in the B-position also form a continuous wraparound sequence.

According to certain embodiments, e.g. as shown and described herein with reference to FIG. 24, the controller selects the application-effective electric potentials such that, at each actuation clock cycle, the numbers of all moving elements currently in the A-position form a single continuous wraparound sequence, and the numbers of all moving elements currently in the B-position also form a single continuous wraparound sequence, unless other application-effective electric potentials exist for which k1−k2 is closer to net-moves. at any actuation clock cycle when the numbers of all moving elements currently in the A-position and the numbers of all moving elements currently in the B-position do not each form a single continuous wraparound sequence, the controller may select the application-effective electric potentials such that, at a subsequent actuation clock cycle, the numbers of all moving elements currently in the A-position again form a single continuous wraparound sequence, and the numbers of all moving elements currently in the B-position also again form a single continuous wraparound sequence. At any actuation clock cycle when the numbers of all moving elements currently in the A-position and the numbers of all moving elements currently in the B-position do not each form a single continuous wraparound sequence, the controller may select the application-effective electric potentials such that, at a subsequent actuation clock cycle, the numbers of all moving elements currently in the A-position again form a single continuous wraparound sequence, and the numbers of all moving elements currently in the B-position also again form a single continuous wraparound sequence, unless other application-effective electric potentials exist for which k1−k2 is closer to net-moves.

According to certain embodiments, e.g. as shown and described herein with reference to FIG. 24, the controller may select the application-effective electric potentials such that, at each actuation clock cycle, the numbers of all moving elements currently in the A-position form S continuous wraparound sequences, and the numbers of all moving elements currently in the B-position also form S continuous wraparound sequences, where S is a positive integer. the controller may select the application-effective electric potentials such that, at each actuation clock cycle, the numbers of all moving elements currently in the A-position form S continuous wraparound sequences, and the numbers of all moving elements currently in the B-position also form S continuous wraparound sequences, where S is a positive integer, unless other application-effective electric potentials exist for which k1−k2 is closer to net-moves. at any actuation clock cycle when the numbers of all moving elements currently in the A-position and the numbers of all moving elements currently in the B-position each form more than S continuous wraparound sequences, the controller may select the application-effective electric potentials such that, at a subsequent actuation clock cycle, the numbers of all moving elements currently in the A-position again form only S continuous wraparound sequences, and the numbers of all moving elements currently in the B-position also again form only S continuous wraparound sequences. at any actuation clock cycle when the numbers of all moving elements currently in the A-position and the numbers of all moving elements currently in the B-position each form more than S continuous wraparound sequences, the controller may select the application-effective electric potentials such that, at a subsequent actuation clock cycle, the numbers of all moving elements currently in the A-position again form only S continuous wraparound sequences, and the numbers of all moving elements currently in the B-position also again form only S continuous wraparound sequences, unless other application-effective electric potentials exist for which k1−k2 is closer to net-moves.

According to certain embodiments, e.g. as shown and described herein with reference to FIGS. 15-23, the controller selects the application-effective electric potentials such that the numbers of any moving elements released from the first extreme position during any actuation clock cycle immediately follow the numbers of those moving elements most recently released from the first extreme position, wrapping back to 0 after reaching Nr×Nc−1. the controller may select the application-effective electric potentials such that the numbers of any moving elements released from the first extreme position during any actuation clock cycle immediately follow the numbers of those moving elements most recently released from the first extreme position, wrapping back to 0 after reaching Nr×Nc−1, unless other application-effective electric potentials exist for which k1−k2 is closer to net-moves. The controller may additionally select the application-effective electric potentials such that the numbers of any moving elements released from the second extreme position during any actuation clock cycle also immediately follow the numbers of those moving elements most recently released from the second extreme position, wrapping back to 0 after reaching Nr×Nc−1. The controller may additionally select the application-effective electric potentials such that the numbers of any moving elements released from the second extreme position during any actuation clock cycle also immediately follow the numbers of those moving elements most recently released from the second extreme position, wrapping back to 0 after reaching Nr×Nc−1, unless other application-effective electric potentials exist for which k1−k2 is closer to net-moves. the controller may select the application-effective electric potentials such that all moving elements released from the first extreme position during the same actuation clock cycle are all in a single first C-subset, unless other application-effective electric potentials exist for which k1−k2 is closer to net-moves. The controller may additionally select the application-effective electric potentials such that all moving elements released from the second extreme position during the same actuation clock cycle are all in a single second C-subset, unless other application-effective electric potentials exist for which k1−k2 is closer to net-moves.

According to certain embodiments, e.g. as shown and described herein with reference to FIG. 14, the controller includes, apart from element selection functionality, some or all of a scaler, a quantizer which may or may not use dither, at least one level shifter, a low-pass filter and a sample-rate converter.

Figure 13:
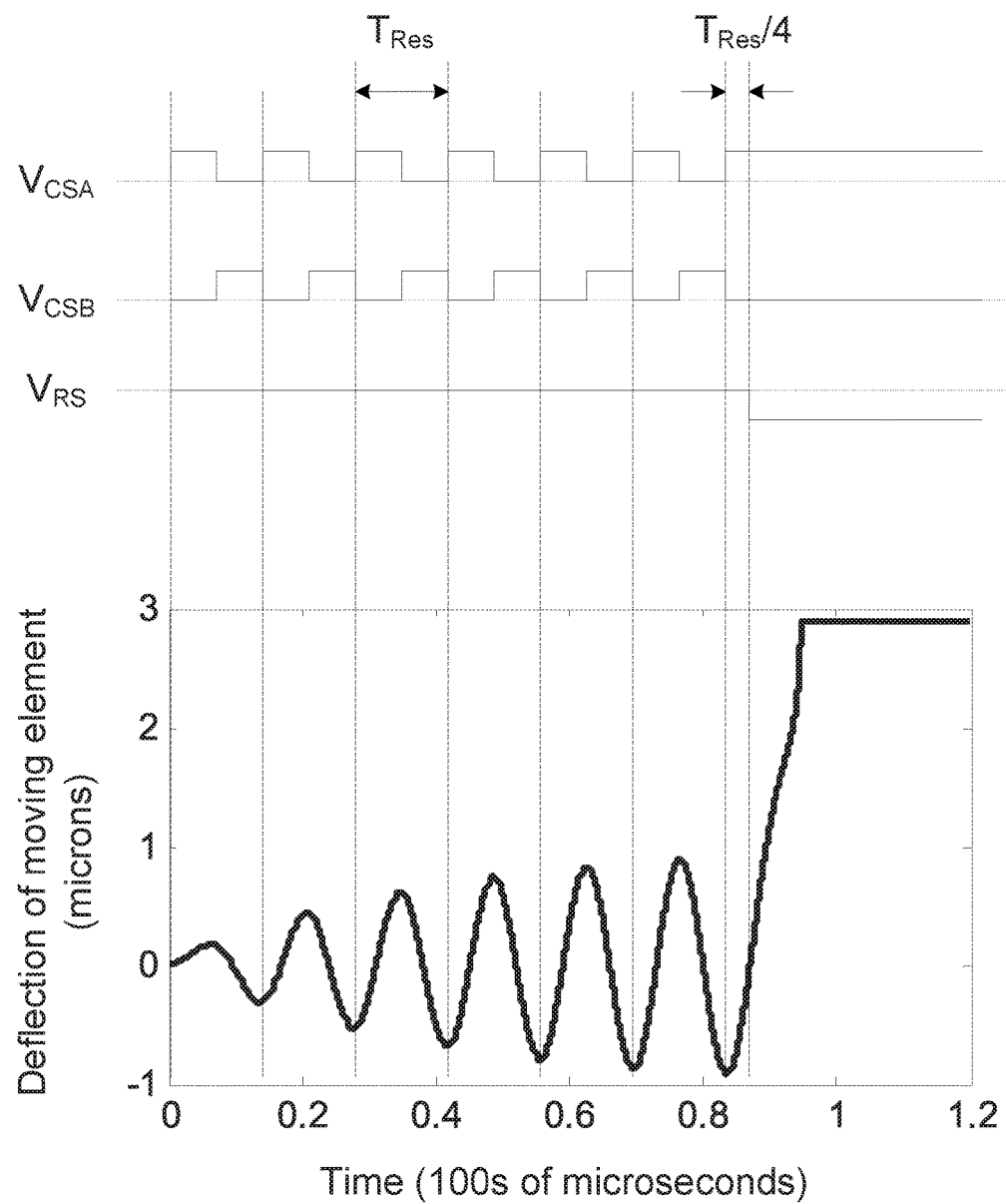

According to certain embodiments, e.g. as shown and described herein with reference to FIG. 13, in the absence of any potentials applied to the first plurality of Nr electrical connections, the second plurality of Nc electrical connections, and the third plurality of Nc electrical connections, such as for example, when the apparatus is powered down, the moving elements may return to a resting position located between the first and second extreme positions, and the controller additionally comprises means to cause one or more of the moving elements to move from their resting position to one of the first and second extreme positions. The controller may be operative for simultaneously causing all of the moving elements within the actuator array to move from their resting position to one of the first and second extreme positions.

The controller may be operative for causing some of the moving elements to move from their resting position to the first extreme position, while simultaneously causing others of the moving elements to move from their resting position to the second extreme position.

The controller may effect the movement of moving elements from their resting position to one of the first and second extreme positions, and movements of moving elements between their first and second extreme positions, using a single predetermined, finite set of electric potentials. The differences between the potentials may not be sufficient in magnitude to cause moving elements to move directly from equilibrium at their resting position to one of the extreme positions. The controller may effect the movement of moving elements from their resting position to one of the first and second extreme positions by applying a predetermined sequence of potentials to one or more members of the first plurality of Nr electrical connections, the second plurality of Nc electrical connections, and the third plurality of Nc electrical connections.

According to certain embodiments, e.g. as shown and described herein with reference to FIG. 13, the predetermined sequence may comprise a first part wherein the controller repeatedly changes one or more of the potentials applied to the members of the first plurality of Nr electrical connections, the second plurality of Nc electrical connections, and the third plurality of Nc electrical connections, such that these changes in one or more potentials cause the moving elements to oscillate around their resting position at their mechanical resonance frequency; and a second part wherein the controller applies to the members of the first plurality of Nr electrical connections, the second plurality of Nc electrical connections, and the third plurality of Nc electrical connections a set of potentials which maximizes the electrostatic force attracting each moving elements towards the extreme position to which it is to be moved. The controller may be operative to time a transition from the first part to the second part to occur at a point in time where each of the moving elements is closer to the extreme position to which it is to be moved than to the opposite extreme position. The changes in one or more potentials during the first part may occur periodically at a frequency which is twice the mechanical resonance frequency of the moving elements.

Figure 27:
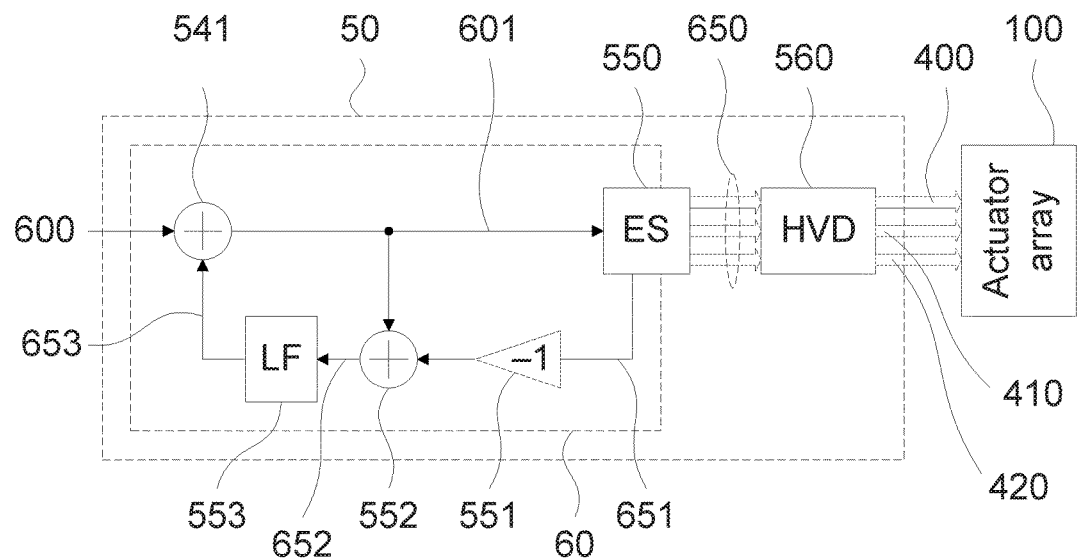
FIGS. 27-29 are simplified block diagrams of a controller and actuator array controlled thereby, all constructed and operative in accordance with certain embodiments of the invention.

According to certain embodiments, e.g. as shown and described herein with reference to FIG. 27, addressing noise results from nonzero differences (addressing errors) between k1−k2 and net_moves during one or more actuation clock cycles, the addressing noise having a frequency spectrum, wherein the controller includes an addressing noise shaping loop operative to shape the frequency spectrum of the addressing noise, such that addressing noise energy is reduced within a frequency band of interest and increased outside the band of interest. The noise shaping loop may have a loop filter having an impulse response and receiving the addressing noise, such that the frequency spectrum of the addressing noise is shaped according to an addressing noise transfer function determined by the impulse response.

Figure 29:
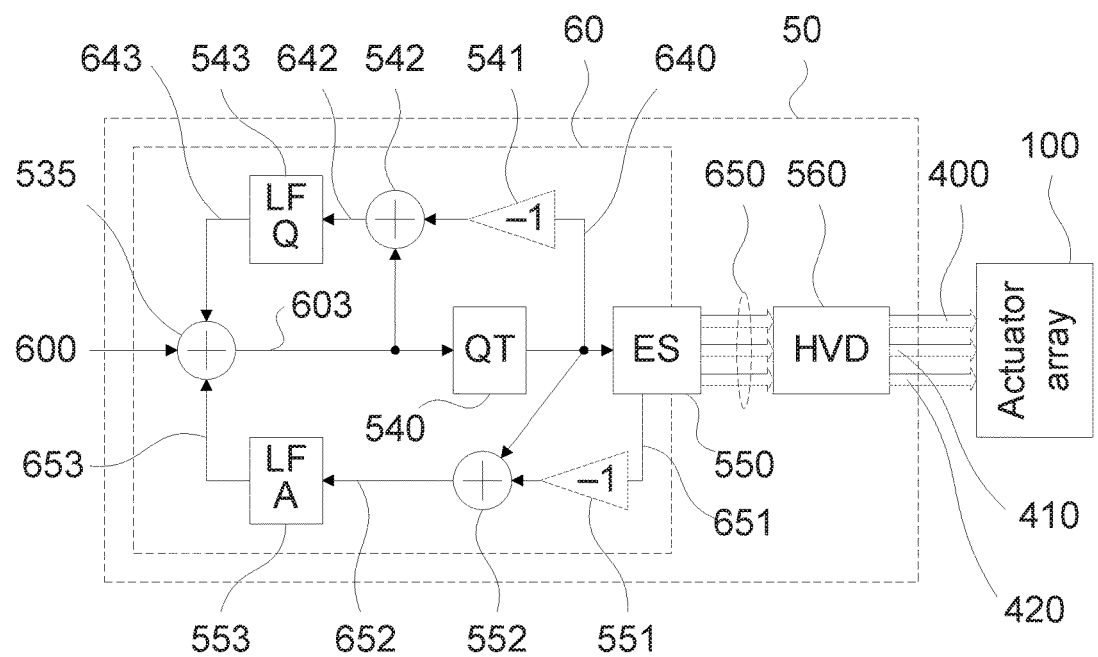

According to certain embodiments, e.g. as shown and described herein with reference to FIG. 29, quantization noise results from the number of actuator elements in the actuator array being less than the number of possible values that the digital input signal can assume, the quantization noise having a frequency spectrum, and the controller includes a quantization noise shaping loop operative to shape the frequency spectrum of the quantization noise, such that quantization noise energy is reduced within a frequency band of interest and increased outside the band of interest. The noise shaping loop may have a loop filter having an impulse response and receiving quantization noise, such that the frequency spectrum of the quantization noise is shaped according to a quantization noise transfer function determined by the impulse response.

Figure 28:
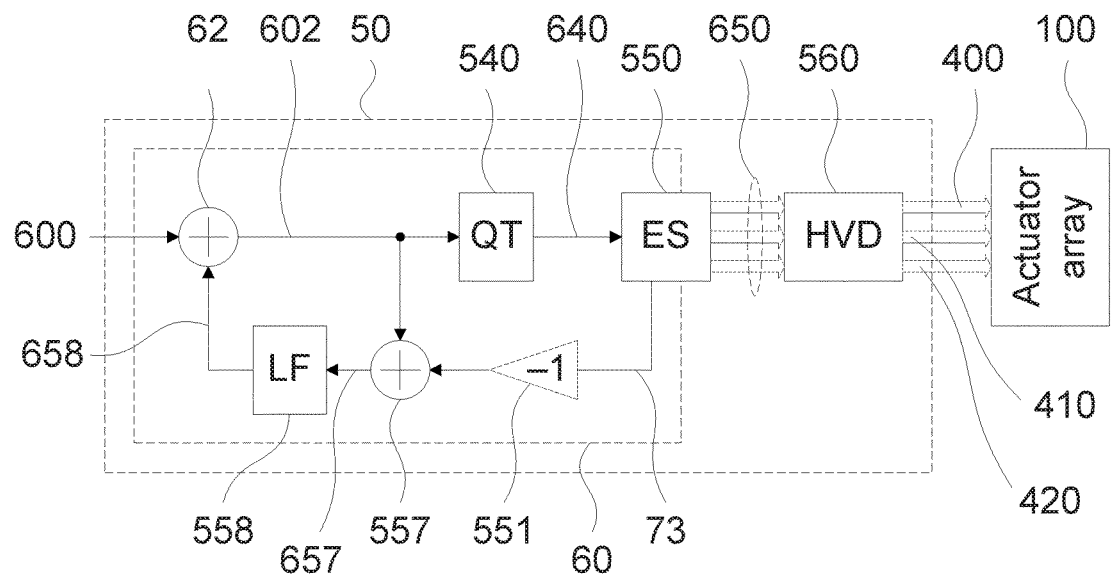

According to certain embodiments, e.g. as shown and described herein with reference to FIG. 28, the controller includes a noise shaping loop operative to shape the frequency spectra of both of the addressing noise and the quantization noise, such that both addressing noise energy and quantization noise energy are reduced within a frequency band of interest and increased outside the band of interest. The noise shaping loop may have a single loop filter having a single impulse response and receiving the sum of the addressing noise and the quantization noise, such that the frequency spectra of both of the addressing noise and the quantization noise are shaped according to a single noise transfer function determined by the single impulse response.

According to certain embodiments, e.g. as shown and described herein with reference to FIG. 29, addressing noise results from nonzero differences (addressing errors) between k1–k2 and net moves during one or more actuation clock cycles, the addressing noise having an addressing noise spectrum, and the apparatus also suffers from quantization noise resulting from the number of actuator elements in the actuator array being less than the number of possible values that the digital input signal can assume, the quantization noise having a quantization noise spectrum, and the controller includes an addressing noise shaping loop operative to shape the frequency spectrum of the addressing noise and a quantization noise shaping loop operative to shape the frequency spectrum of the quantization noise, such that both addressing noise energy and quantization noise energy are reduced within respective frequency bands of interest and increased outside the bands of interest. The addressing noise shaping loop may have a first loop filter having a first impulse response and receiving the addressing noise, and the quantization noise shaping loop may have a second loop filter having a second impulse response and receiving the quantization noise, such that the frequency spectrum of the addressing noise is shaped according to a first noise transfer function determined by the first impulse response, and the frequency spectrum of the quantization noise is shaped according to a second noise transfer function determined by the second impulse response.

According to certain embodiments, e.g. as shown and described herein with reference to FIG. 13, the duration of the second part is at least half the mechanical resonance period (Tres) of the moving elements. The set of potentials may be selected from among the predetermined, finite set of electric potentials, and does not change during the second part.

According to certain embodiments, e.g. as shown and described herein with reference to FIG. 24, the controller generates, at each actuation clock cycle, Nr R-signals r0 to r(Nr−1) controlling the potential applied to each of the R-wires R0 to R(Nr−1), Nc A-signals a0 to a(Nc−1) controlling the potential applied to each of the A-wires A0 to A(Nc−1), and Nc B-signals b0 to b(Nc−1) controlling the potential applied to each of the B-wires B0 to B(Nc−1).

The assignment of R-signals to R-wires, A-signals to A-wires and B-signals to B-wires may be fixed, e.g. such that each of the R-signals r0 to r(Nr−1) always controls the same R-wire, each of the A-signals a0 to a(Nc−1) always controls the same A-wire, and each of the B-signals b0 to b(Nc−1) always controls the same B-wire.

Optionally, the controller changes the assignment of R-signals to R-wires and/or the assignment of A-signals to A-wires and B-signals to B-wires during operation of the apparatus.

The changes in the assignment of R-signals to R-wires and/or the assignment of A-signals to A-wires and B-signals to B-wires may occur periodically.

The changes in the assignment of R-signals to R-wires and/or the assignment of A-signals to A-wires and B-signals to B-wires may occur synchronously with the actuation clock.

The changes in the assignment of R-signals to R-wires and/or the assignment of A-signals to A-wires and B-signals to B-wires may alter the order in which moving elements are subsequently released from one of the extreme positions.

The changes in the assignment of R-signals to R-wires and/or the assignment of A-signals to A-wires and B-signals to B-wires may shape the frequency spectrum of mismatch noise resulting from differences in the magnitude of the physical effect produced by each actuator element, such that the physical effect produced by the apparatus as a whole more closely resembles the target physical effect. The shaping of the frequency spectrum of the mismatch noise may for example comprise reducing the magnitude of peaks in the frequency spectrum of the mismatch noise.

Typically, the changes in the assignment of R-signals to R-wires and/or the assignment of A-signals to A-wires and B-signals to B-wires do not result in any immediate change in any of the potentials applied to the R-wires, A-wires and B-wires.

Typically, the changes in the assignment of R-signals to R-wires and/or the assignment of A-signals to A-wires and B-signals to B-wires do not result in any immediate change in the position of any moving element within the actuator array.

The term "immediate" refers to an occurrence at substantially the same time that the changes in the assignment of R-signals to R-wires and/or the assignment of A-signals to A-wires and B-signals to B-wires" occur.

The changes in the assignment of R-signals to R-wires may include swapping of two R-signals, such that a first R-wire previously controlled by a first R-signal becomes controlled by a second R-signal, and a second R-wire previously controlled by the second R-signal becomes controlled by the first R-signal.

The controller may be operative to identify sets of swappable R-signals, and where at least one of the sets of swappable R-signals has more than one member, to determine a new assignment of R-signals to R-wires.

The controller may be operative to identify sets of swappable R-signals such that, for any particular R-signal within a set of swappable R-signals, the moving elements in the R-subset whose R-wire is currently controlled by the particular R-signal, and the moving elements in all R-subsets whose R-wire is currently controlled by another R-signal within the same set of swappable R-signal, are all in the same position and (if in movement) moving in the same direction.

The controller may be operative to identify sets of swappable R-signals such that, for any particular R-signal within a set of swappable R-signals, and for any number i from 0 up to and including Nc−1, the moving element at the intersection of C-subset i and the R-subset whose R-wire is currently controlled by the particular R-signal is in the same position and (if in movement) moving in the same direction as the moving element at the intersection of C-subset i and any other R-subset whose R-wire is currently controlled by any other of the R-signals within the same set of swappable R-signals.

The controller may employ a pseudo-random number generator for determining the new assignment of R-signals to R-wires.

The changes in the assignment of A-signals to A-wires and B-signals to B-wires may include swapping of two A-signals and the respective B-signals, e.g. such that a first A-wire and a first B-wire, previously controlled by a first A-signal and a first B-signal respectively, become controlled by a second A-signal and a second B-signal respectively, and a second A-wire and a second B-wire, previously controlled by the second A-signal and the second B-signal respectively, become controlled by the first A-signal and the first B-signal respectively.

The controller may be operative to identify sets of swappable A-signals and respective B-signals, and where at least one of the sets of swappable A-signals and respective B-signals has more than one member, to determine a new assignment of A-signals to A-wires and respective B-signals to B-wires.

The controller may be operative to identify sets of swappable A-signals and respective B-signals, such that, for any particular A-signal and particular B-signal within a set of swappable A-signals and respective B-signals, the moving elements in the C-subset whose A-wire and B-wire are currently controlled by the particular A-signal and particular B-signal respectively, and the moving elements in all C-subsets whose A-wire and B-wire are currently controlled another A-signal and its respective B-wire within the same set of swappable A-signals and respective B-signals, are all in the same position and (if in movement) moving in the same direction.

The controller may be operative to identify sets of swappable A-signals and respective B-signals, such that, for any particular A-signal and particular B-signal within a set of swappable A-signals and respective B-signals, and for any number i from 0 up to and including Nr−1, the moving element at the intersection of R-subset i and the C-subset whose A-wire and B-wire are currently controlled by the particular A-signal and the particular B-signal respectively is in the same position and (if in movement) moving in the same direction as the moving element at the intersection of R-subset i and any other C-subset whose A-wire and B-wire are currently controlled by one of the A-signals and its respective B-signal within the same set of swappable A-signals and respective B-signals.

The controller may employ a pseudo-random number generator for determining the new assignment of A-signals to A-wires and respective B-signals to B-wires.

The controller may be operative to identify sets of swappable R-signals such that, for each particular R-signal within a set of swappable R-signals, the electrical potential currently applied to the R-wire controlled by said particular R-signal is the same as the electrical potential currently applied to any R-wire controlled by any other R-signal within the same set of swappable R-signals.

The controller may be operative to identify sets of swappable A-signals and respective B-signals such that, for each particular A-signal and respective B-signal within a set of swappable A-signals and respective B-signals, the electrical potentials currently applied to the A-wire and respective B-wire controlled by said particular A-signal and respective B-signal are the same as the electrical potentials currently applied to any A-wire and respective B-wire controlled by any other A-signal and respective B-signal within the same set of swappable A-signals and respective B-signals.

The term "currently" is intended to include an occurrence:
At the time the controller does the "identifying" of swappable sets; or
During the actuation clock cycle in which the controller does the "identifying" of swappable sets; or
During the current actuation clock cycle.

Reference is now made to FIGS. 1A to 1C which are cross-sectional illustrations of one type of double-sided electrostatic actuator element to which the present invention can be applied. The actuator element includes a moving element 120 mechanically connected to the stationary portions of the actuator element by means of a suitable bearing 150 such as a flexure or spring. The bearing 150 defines an axis 125 along which the moving element 120 can travel, prevents the moving element 120 from travelling in other directions, and defines an at-rest position of the moving element 120. The actuator element further comprises two electrodes 130 and 140, also referred to hereinafter as "A-electrode" and "B-electrode" respectively, disposed on opposite sides of the moving element 120. The moving element 120 is separated from the electrodes 130 and 140 by spacers 180 and 190. Dimples 210 and 220 are formed on the surfaces of the electrodes 130 and 140 respectively which each face the moving element 120.

FIG. 1A shows the moving element 120 in its resting position, with no voltage applied between the moving element 120 and either electrode 130 and 140.

Applying a voltage between the moving element and either electrode produces an electrostatic force attracting the moving element towards that electrode, the magnitude of the electrostatic force being proportional to the magnitude of the voltage applied, and inversely proportional to the square of the separation distance between facing surfaces of moving element 120 and the respective electrode. At the same time, any movement of the moving element 120 away from its resting position causes bearing 150 to exert on the moving element 120 a spring force pulling it back towards its resting position. Moving element 120 may also be affected by other forces such as damping or friction forces which may either occur naturally or be deliberately introduced for practical reasons such as to improve long-term reliability. However, such additional forces are not required for the purposes of the present invention. The moving element 120 may reach an equilibrium position where the sum of all forces acting on it is zero, or it may be latched as described under FIGS. 1B and 1C.

FIG. 1B shows moving element 120 latched in a first extreme position, as close as possible to A-electrode 130 and as far as possible from B-electrode 140, also referred to hereinafter as the "A-position". Typically, moving element 120 reaches this position as a result of a voltage $V_A$ being applied between A-electrode 130 and moving element 120, generating an electrostatic force, also referred to hereinafter as "A-force", attracting moving element 120 towards A-electrode 130. As moving element 120 approaches A-electrode 130, the A-force increases inversely proportional to the square of the separation distance between facing surfaces of moving element 120 and electrode 130, whereas the spring force pulling moving element 120 back towards its resting position increases proportionally to its deflection from its resting position. Depending on the spring constant of bearing 150 and on the range of $V_A$, a critical point may exist along axis 125 where A-force and the spring force are equal and any further travel of moving element 120 towards A-electrode 130 causes the A-force to grow more quickly than the spring force. If moving element 120 moves even marginally beyond this critical point, and assuming that $V_A$ remains constant, the balance of forces causes moving element 120 to accelerate towards A-electrode 130 until it makes contact with dimples 210, a process referred to hereinafter as "latching". After latching, the magnitude of $V_A$ sufficient to hold moving element 120 in this position (referred to hereinafter as "hold voltage"), is smaller than the magnitude of $V_A$ sufficient to achieve latching of moving element 120 into the A-position (referred to hereinafter as "latching voltage").

When moving element 120 is latched in the A-position and a second voltage $V_B$ is applied between B-electrode 140 and moving element 120, the electrostatic force resulting from $V_B$ is significantly smaller in magnitude than the A-force resulting from a $V_A$ of equal magnitude. Hence, the presence of a non-zero $V_B$ only marginally increases the magnitude of the hold voltage sufficient to keep moving element 120 latched in the A-position.

If $V_A$ subsequently falls below the hold voltage, the A-force becomes smaller in magnitude than the spring force, causing moving element 120 to move away from the A-position and towards its resting position, a process referred to hereinafter as "release". With both $V_A$ and $V_B$ equal to zero, moving element 120 then oscillates around its resting position with its frequency of oscillation, also referred to hereinafter as its "mechanical resonance frequency", determined primarily by the mass of moving element 120 and the spring constant of bearing 150 (neglecting damping), and the amplitude of oscillation gradually decreasing as a result of friction, air damping or other energy loss. Alternatively, in the presence of a non-zero $V_B$ of sufficient magnitude, moving element 120 is latched into a second extreme position, as close as possible to B-electrode 140 and as far as possible from A-electrode 130, also referred to hereinafter as the "B-position".

According to one embodiment of the present invention, the controller may adjust $V_A$ and $V_B$ such that moving element 120 is always either in the A-position or the B-position, or transitioning between these two positions; i.e. during normal operation, moving element 120 never settles in its resting position or any other position except the two extreme positions.

When moving element 120 reaches its resting position during transitions between the two extreme positions, it has non-zero kinetic energy and linear velocity relative to electrodes 130 and 140 and therefore continues to travel towards its new extreme position until its kinetic energy is absorbed by bearing 150. Since latching moving element 120 from a position closer to its new extreme position requires a lower electrostatic force than latching moving element 120 into that same extreme position from equilibrium at its resting position, latching voltages are lower for transitions between extreme positions than for latching from rest.

The purpose of dimples 210 is to maintain an air gap 240, thereby allowing air to flow through holes 270 in the electrode 130 and into the space between the moving element 120 and first electrode 130 more easily than would be the case without an air gap, thereby facilitating a faster release of moving element 120 from the A-position. If dimples 210 include electrically insulating material, they may also serve to insulate moving element 120 from electrode 130. If dimples 210 include electrically conductive material, then some other means of electrical insulation may be employed, such as coating at least one of moving element 120 and electrode 130 with electrically insulating material.

FIG. 1C shows the moving element 120 latched in the B-position, as close as possible to electrode 140 and as far as possible from electrode 130. Latching of the moving element 120 into the B-position and release from the B-position may be achieved in a manner analogous to that described under FIG. 1B above, reversing the roles of A-electrode 130 and B-electrode 140, that of $V_A$ and $V_B$, and that of A-force and B-force. The function of dimples 220 and air gap 250 is analogous to that of dimples 210 and air gap 240 described above. In certain embodiments, the actuator element's geometry is substantially symmetric about the plane of moving element 120, resulting in hold and latching voltages for the B-position substantially equal to those for the A-position. Alternatively, the actuator element's geometry may be asymmetric; for example, spacers 180 and 190 may differ in thickness, resulting in two different latching voltages for the A-position and B-position respectively; and/or dimples 210 and 220 may differ in height, resulting in two different hold voltages.

Suitable materials and manufacturing techniques for the production of actuator elements as shown in FIG. 1A-C and closely related types of actuator elements are discussed in co-owned WO2011/111042 ("Electrostatic Parallel Plate Actuators Whose Moving Elements Are Driven Only By Electrostatic Force and Methods Useful in Conjunction Therewith"), published 15 Sep. 2011.

The present invention does not depend on any particular materials or manufacturing techniques.

It is appreciated that the polarity of voltages $V_A$ and $V_B$ can be reversed without affecting operation of the actuator element, since both electrostatic forces are the same, regardless of the polarity of these voltages.

The orientation of the devices shown and described herein relative to the horizontal need not be as shown. For example, the apparatus of FIGS. 1A-1C may be disposed such that the layers are horizontal, as shown, or may for example be disposed such that the layers are vertical. Also, the apparatus may be set on its side or may be inverted, if desired, such that the electrode layer 140 is atop the moving element 120 rather than vice versa. According to certain embodiments, the force of gravity is negligible, since the forces exerted on the moving element by the bearing 150 and the electrostatic forces generated by the electrode or electrodes are many orders of magnitude larger than gravitational forces.

The term "air gap" is used herein merely by way of example since the apparatus of the present invention normally operates in air however this need not be the case and alternatively, for example, the apparatus may operate in any other suitable medium.

It is also appreciated that the dimples shown in FIGS. 1A to 1C are not required for the purposes of the present invention. Furthermore, dimples can be formed on the surface of the moving element 120 instead of the electrodes 210 and 220, or mechanical limiters, e.g. as described in FIG. 2 in co-owned WO2011/111042 ("Electrostatic Parallel Plate Actuators Whose Moving Elements Are Driven Only By Electrostatic Force and Methods Useful in Conjunction Therewith"), published 15 Sep. 2011, may be used instead of dimples.

FIG. 2 is a simplified schematic diagram of an actuator array in accordance with certain embodiments of the invention, comprising a plurality of electrostatic actuator elements 110, which may, for example, be of the type shown and described herein e.g. with reference to FIGS. 1A-1C.

The actuator elements 110 are partitioned into Nr first subsets, referred to hereinafter as "R-subsets", whose moving elements are electrically interconnected, resulting in a set of Nr interconnections 400, referred to hereinafter as "R-wires". Additionally, the actuator elements 110 are also partitioned into Nc second subsets, referred to hereinafter as "C-subsets", whose A-electrodes and B-electrodes respectively are electrically interconnected, resulting in a first set of Nc interconnections 410, referred to hereinafter as "A-wires", for the A-electrodes and a second set of Nc interconnections 420, referred to hereinafter as "B-wires", for the A-electrodes.

In the Figure, Nr=Nc=3, however the subsets may contain any number of actuator elements. In certain embodiments, all R-subsets contain Nc actuator elements, all C-subsets contain Nr actuator elements, and the total number of moving elements in the array is Nr×Nc. In FIG. 2, the R-subsets are arranged in rows and the C-subsets in columns, however any other layout of actuator elements may also be used.

Each R-wire, A-wire and B-wire is also connected to a controller 50. Thus, the total number of electrical interconnections between the array and the controller 50 is Nr+2Nc, whereas implementations with dedicated interconnections for each actuator element may employ more such interconnections. For example, providing separate interconnections for each moving element, each A-electrode and each B-electrode may employ 3×Nr×Nc interconnections; alternatively, providing separate interconnections for each moving element plus one shared connection each for all A-electrodes and all B-electrodes may employ (Nr×Nc)+2 interconnections, e.g. as described in co-owned WO2011/111042 ("Electrostatic Parallel Plate Actuators Whose Moving Elements Are Driven Only By Electrostatic Force and Methods Useful in Conjunction Therewith"), published 15 Sep. 2011.

Actuator arrays of the type described may be manufactured, for example, on a single monolithic die of silicon or other semiconductors or certain metals, using MEMS fabrication techniques e.g. as described in co-owned WO2011/111042 ("Electrostatic Parallel Plate Actuators Whose Moving Elements Are Driven Only By Electrostatic Force and Methods Useful in Conjunction Therewith"), published 15 Sep. 2011.

FIG. 3 is a simplified schematic diagram of an actuator array in accordance with certain embodiments of the invention, similar to the array shown in FIG. 2, but where the R-subsets do not coincide with rows and the C-subsets do not coincide with columns. The array comprises 64 actuator elements 110, partitioned into eight R-subsets and four C-subsets. Each R-subset has one R-wire, labeled R0 to R7 respectively, and each C-subset has one A-wire and one B-wire, labeled A0 to A3 and B0 to B3 respectively. Every intersection of one R-subset and one C-subset contains two actuator elements. Every R-subset contains four actuator elements from one row and four actuator elements from another row; for example, R-subset 1, associated with R-wire R1, contains the left-hand half of the top row and the right-hand half of the second row from the top. Every C-subset contains all the actuator elements of two adjacent columns; for example, C-subset 1, associated with A-wire A1 and B-wire B1, contains the third and fourth columns from the left.

Actuator arrays constructed in accordance with the invention may have their actuator elements laid out in any pattern, and may have any number of actuator elements at each intersection of one R-subset and one C-subset. Certain embodiments have the same number of actuator elements at each such intersection.

The terms "latching voltage" and "hold voltage" for a single, specific actuator element have been defined previously with reference to FIG. 1B. In the following, these terms are defined for an actuator array, whose actuator elements may not all be exactly identical. Additionally, the term "release voltage" is also defined below for use hereinafter.

"Latching voltage" $V_L$ means a voltage of only just sufficient magnitude to reliably latch any of the moving elements within the array into either its A-position or its B-position as described with reference to FIG. 1B, after the moving element has been released from the opposite extreme position. This latching voltage for an actuator array is typically slightly higher than the latching voltage for an individual actuator element previously defined with reference to FIG. 1B, e.g. because: (1) since the geometry of individual actuator elements may vary due to manufacturing tolerances, each individual actuator element may have a slightly different latching voltage; the $V_L$ defined here typically exceed all of them by definition. (2) likewise, asymmetry in an actuator element's geometry may produce two different latching voltages for its A-position and B-position, respectively; in this case, the $V_L$ defined here typically exceeds the higher of the two. (3) depending on the actuator array's intended usage, actuator elements 110 may be subject to environmental conditions such as mechanical shock (e.g. in portable/handheld applications), magnetic fields, or air flow, which may produce additional forces on their moving elements 120. In order for latching to be reliable, the $V_L$ defined here are typically sufficient to overcome such additional forces under the environmental conditions for which the array is designed.

"Hold voltage" $V_H$ means a voltage of only just sufficient magnitude to hold any of the moving elements within the array in either of the two extreme positions. This hold voltage will typically be slightly higher than the hold voltage for an individual actuator element defined with reference to FIG. 1B, for the same reasons described above with reference to "latching voltage".

"Release voltage" $V_R$ means a voltage whose magnitude is only just sufficiently low to release any of the actuator elements within the array from either of its two extreme positions. For an ideal actuator element, the difference between $V_R$ and $V_H$ is infinitesimal; however, in a real array, there is a finite difference between $V_R$ and $V_H$ due to the manufacturing tolerances, asymmetry and environmental conditions described above with reference to "latching voltage".

The present invention, according to certain embodiments, employs an actuator array's hold voltage $V_H$ sufficiently low in magnitude to not induce any individual actuator element to latch into either extreme position.

Figure 4:
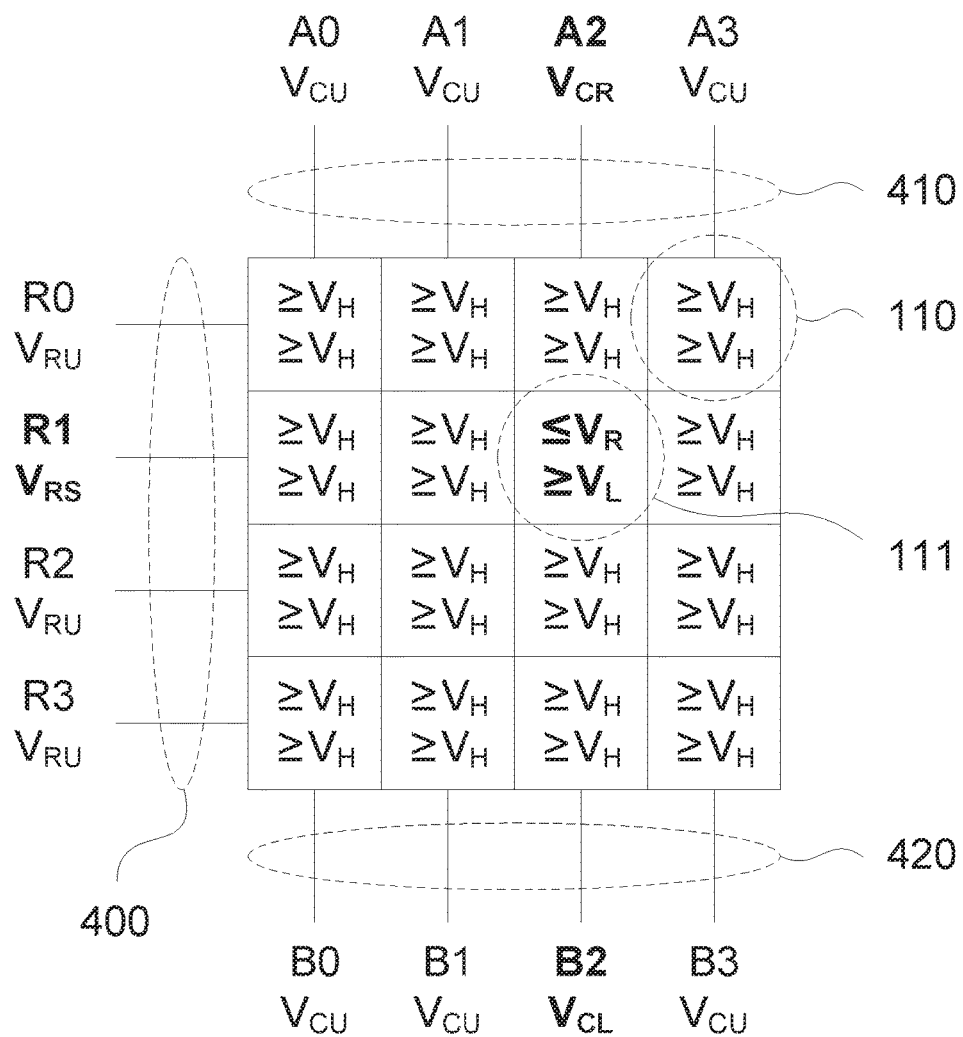

FIG. 4 is a simplified representation of an actuator array in accordance with certain embodiments of the invention, comprising sixteen actuator elements partitioned into four R-subsets and four C-subsets, analogously to the actuator array shown in FIG. 2. R-wires are labeled R0 to R3, A-wires A0 to A3 and B-wires B0 to B3. Each square represents one actuator element 110. The actuator element located at the intersection of R-subset 1 and C-subset 2, also referred to hereinafter as the "selected element" and labeled 111, is currently latched in the A-position and is to be moved into the B-position. Hence, the task of controller 50 in this example is to apply suitable electric potentials to the array's R-wires, A-wires and B-wires such that the selected element is released from the A-position and latched into the B-position, while keeping all other actuator elements within the array, also referred to hereinafter as "unselected elements", latched in whichever of the two extreme positions they currently are. Within each square in FIG. 4, the top line refers to the magnitude of $V_A$ and the bottom line to the magnitude of $V_B$ sufficient to achieve this. For the selected element, the magnitude of $V_A$ is equal to or less than the release voltage $V_R$ and the magnitude of $V_H$ equal to or larger than the latching voltage $V_L$; whereas for all unselected elements, the magnitude of both $V_A$ and $V_H$ is equal to or higher than the hold voltage $V_H$.

This can be achieved by:
  applying a first voltage $V_{RS}$ ("selected R-voltage") to the R-wire connected to the selected element, also referred to hereinafter as the "selected R-wire", in this case R1, while applying a second voltage $V_{RU}$ ("unselected R-voltage") to all other R-wires; this process is referred to hereinafter as "selecting" an R-wire, or the R-subset associated with an R-wire; and
  applying a third voltage $V_{CR}$ ("releasing C-voltage") to the A-wire or B-wire connected to the electrode from which the selected element is to be released, also referred to hereinafter as the "releasing wire", in this case A2, while applying a fourth voltage $V_{CL}$ ("latching C-voltage") to the A-wire or B-wire connected to the electrode to which the selected element is to be latched, also referred to hereinafter as the "latching wire", in this case B2, and also applying a fifth voltage $V_{CU}$ ("unselected C-voltage") to all other A-wires and all other B-wires, also referred to hereinafter collectively as "unselected" A-wires and B-wires; this process is referred to hereinafter as "selecting" a C-subset, and the C-subset containing the releasing wire and the latching wire is referred to hereinafter as the "selected C-subset".

"Drive schemes" described below with reference to FIGS. 5 to 8, are operative for applying appropriate voltages to the R-wires, A-wires and B-wires, such that the following six conditions below are satisfied:

$$|V_{RS}-V_{CR}| \le V_R \qquad 1.$$

Satisfying this condition ensures successful release of the selected element from its current latched position. In certain embodiments it may be desirable to maximize the moving element's acceleration away from the electrode to which it is currently latched, also referred to hereinafter as the "releasing electrode"; in this case it may be preferable to have $|V_{RS}-V_{CR}|=0V$ as this completely eliminates the electrostatic force attracting the moving element to the releasing electrode, as opposed to only reducing this electrostatic force.

$$|V_{RS}-V_{CL}| \ge V_L \qquad 2.$$

Satisfying this condition ensures successful latching of the selected element into its new extreme position.

$$|V_{RS}-V_{CU}| \ge V_H \qquad 3.$$

Satisfying this condition prevents release of any unselected actuator elements located in the selected R-subset.

$$|V_{RU}-V_{CR}| \ge V_H \qquad 4.$$

Satisfying this condition prevents release of any unselected actuator elements located in the selected C-subset and currently latched in the same position as the selected element.

$$|V_{RU}-V_{CL}| \ge V_H \qquad 5.$$

Satisfying this condition prevents release of any unselected actuator elements located in the selected C-subset and latched in the extreme position opposite the selected element's current position.

$$|V_{RU}-V_{CU}| \ge V_H \qquad 6.$$

Satisfying this condition prevents release of unselected actuator elements located at the intersections of any unselected R-subset and any unselected C-subset, and latched in either of the two extreme positions.

The method described herein may also be used to move actuator elements from the B-position to the A-position; in that case, the releasing wire is a B-wire and the latching wire is an A-wire. For example, if the selected element 111 is in the B-position, it may be moved into the A-position by applying $V_{RS}$ to R1, $V_{CL}$ to A2 and $V_{CR}$ to B2. Since selecting more than one R-subset and/or more than one C-subset at the same time selects all actuator elements located at the intersection of any selected R-subset and any selected C-subset, the same method may also be used to move more than one moving element from one extreme position to the other. For example, applying $V_{RS}$ to R2 and R3, $V_{CL}$ to B0 and B1, and $V_{CR}$ to A0 and A1 moves all moving elements in the bottom left quadrant in FIG. 4 from the A-position to the B-position, assuming they are in the A-position to begin with. Any selected actuator elements whose moving element is already in the B-position would remain latched in the B-position.

In certain embodiments, the time during which a moving element moves from one extreme position to the other (including its release from the first extreme position and latching into the second extreme position) is approximately half of the resonance period $T_{res}$ of the selected element, where $T_{res}$ is the inverse of its mechanical resonance frequency described previously with reference to FIG. 1B. The time dedicated to such a movement may be somewhat longer than $T_{res}/2$, e.g. if there is significant friction or damping, or it may be somewhat faster than $T_{res}/2$, e.g. if the magnitude of $V_{RS}-V_{CL}$ is sufficiently high to significantly accelerate the movement. However, in certain embodiments, it is close to $T_{res}/2$.

In order to ensure successful latching of moving elements, the application of $V_{RS}$ to the selected R-wire, $V_{CR}$ to the releasing wire, and $V_{CL}$ to the latching wire, is timed to last long enough for the slowest moving element within the array (allowing for variations due to manufacturing tolerances) to complete a movement, i.e. typically slightly longer than $T_{res}/2$. After this time has elapsed, the selected element is latched in its new position, and the selected R-wire, A-wire and B-wire typically become unselected, i.e. the controller applies $V_{RU}$ to the formerly selected R-wire and $V_{CU}$ to the former latching wire and releasing wire. The controller may then move other moving elements between their extreme positions by selecting other R-subsets and/or C-subsets. In certain embodiments, the voltages applied to R-wires, A-wires and B-wires are all sampled in accordance with a clock, referred to hereinafter as the "actuation clock", whose frequency is typically slightly below double the moving elements' mechanical resonance frequency.

Figure 5:
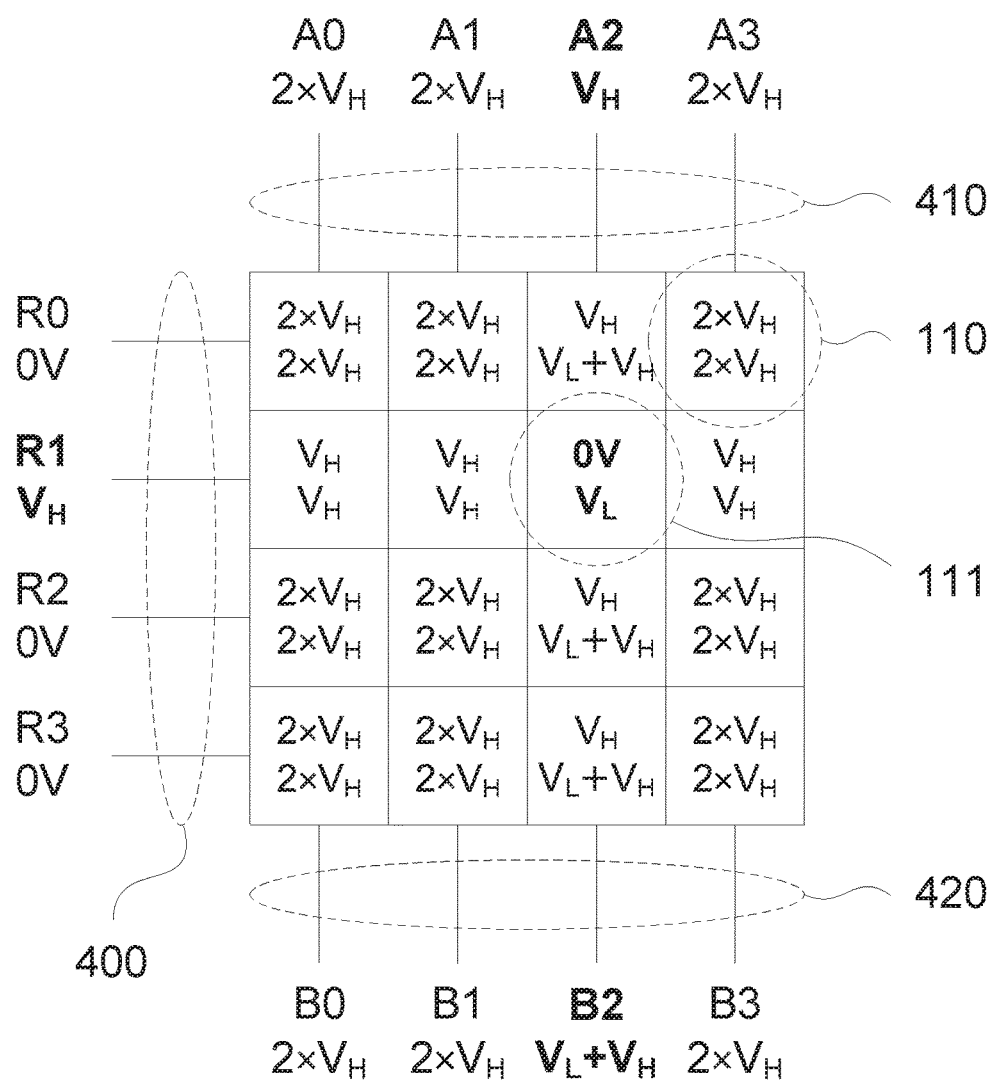
FIGS. 5-7 illustrate drive schemes according to which various actuator arrays may operate, all in accordance with certain embodiments of the invention.

FIG. 5 illustrates the actuator array of FIG. 4 operating according to what is referred to hereinafter as "drive scheme 1". Drive scheme 1 is characterized in that:
  $V_{RS}=V_{CR} \ge V_H$
  $V_{RU}=0$
  $V_{CL} \ge V_L+V_{RS}$
  $V_{CU} \ge 2 \times V_{RS}$ Within each square in FIG. 5, the top line refers to the magnitude of $V_A$ and the bottom line to the magnitude of $V_B$. It can be seen that this drive scheme fulfills the six conditions described above with reference to FIG. 4, and also has a number of additional useful properties, e.g.:

Any number of R-subsets and any number of C-subsets may be selected; all actuator elements located at the intersection of any selected R-subset and any selected C-subset are selected, all other actuator elements are unselected.

Any moving element which is already latched in the desired new position (e.g. in this example, in the B-position), remains in that position. Hence, drive scheme 1 can be used to control a subset of actuator elements which may not all have their moving elements latched in the same position, or whose current latched position may be unknown.

It fulfills the stricter version of the first of the six conditions above ($|V_{RS}-V_{CR}|=0V$), thereby minimizing the time during which selected elements are released from their current latched position.

In order to permit selection of any desired R-subset or R-subsets, a controller implementing drive scheme 1 is operative for applying either of two voltages ($V_{RS}$ or $V_{RU}$) to each R-wire 400. Likewise, in order to permit selection of any desired C-subset or C-subsets, and since each A-wire and each B-wire can be either a releasing wire, a latching wire or an unselected wire at a given time, such a controller is operative for applying either of three voltages ($V_{CR}$, $V_{CL}$ or $V_{CU}$) to each A-wire 410 and to each B-wire 420.

Figure 6:
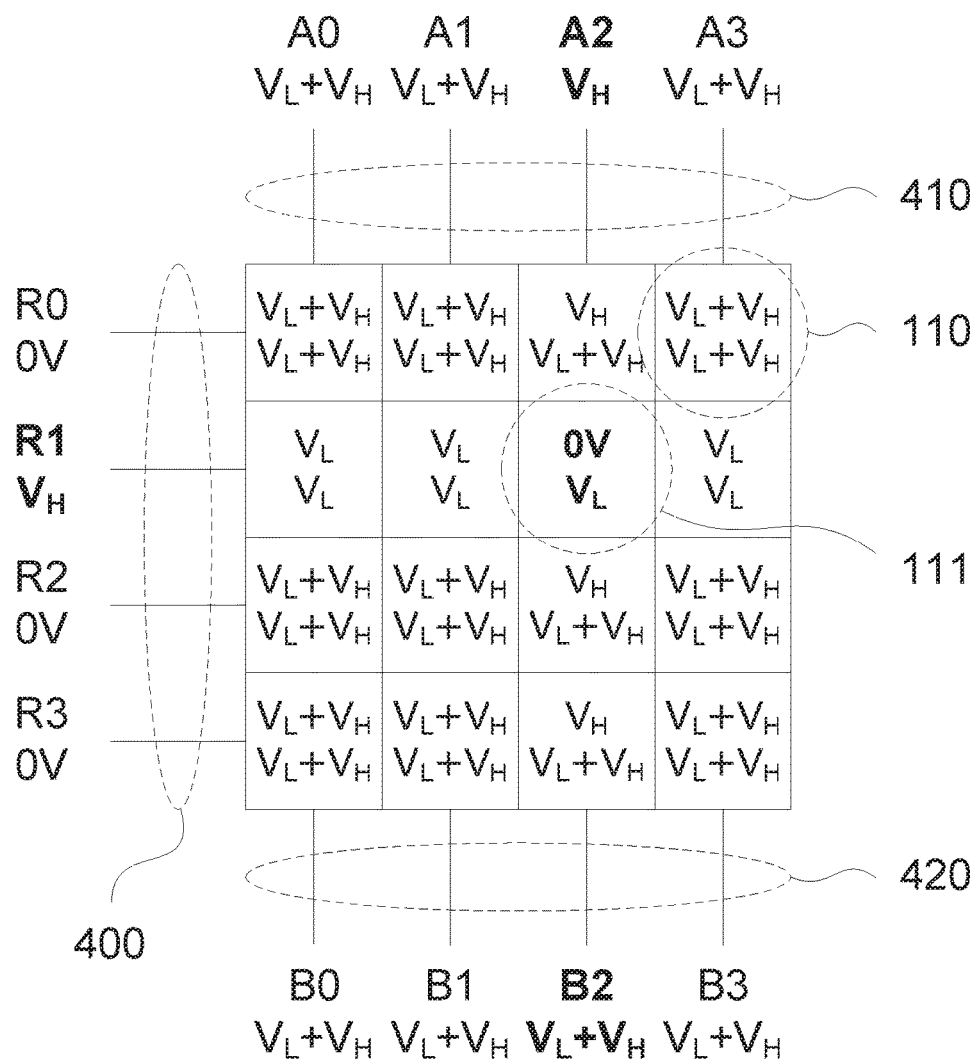

FIG. 6 illustrates the actuator array of FIGS. 4 and 5 operating according to what is referred to hereinafter as "drive scheme 2". This drive scheme is characterized by:

$V_{RS}=V_{CR} \geq V_H$
$V_{RU}=0$
$V_{CL}=V_{CU} \geq V_L+V_{RS}$

The difference between the two drive schemes is that the minimum magnitude of $V_{CU}$ has been increased from $2 \times V_H$ to $V_L+V_H$. Since, by definition, $V_L$ is larger than $V_H$ (as described above with reference to FIG. 4), drive scheme 2 satisfies the six conditions. A controller implementing drive scheme 2 has the advantage that it is capable of applying either of only two voltages ($V_{CR}$ or $V_{CL}/V_{CU}$) to each A-wire 410 and to each B-wire 420, resulting in reduced complexity and cost compared to drive scheme 1 where each A-wire and B-wire can take three different voltages.

Under drive scheme 2, $V_A$ and $V_B$ of those unselected actuator elements in unselected C-subsets are higher in magnitude than with drive scheme 1 and higher than required to keep the unselected elements latched in their current extreme position, but no higher than the highest $V_A$ and $V_B$ already occurring under drive scheme 1 (which equals the difference between $V_{CL}$ and $V_{RU}$ and occurs in actuator elements located at the intersections of unselected R-subsets and selected C-subsets). This is generally not a drawback.

Figure 7:
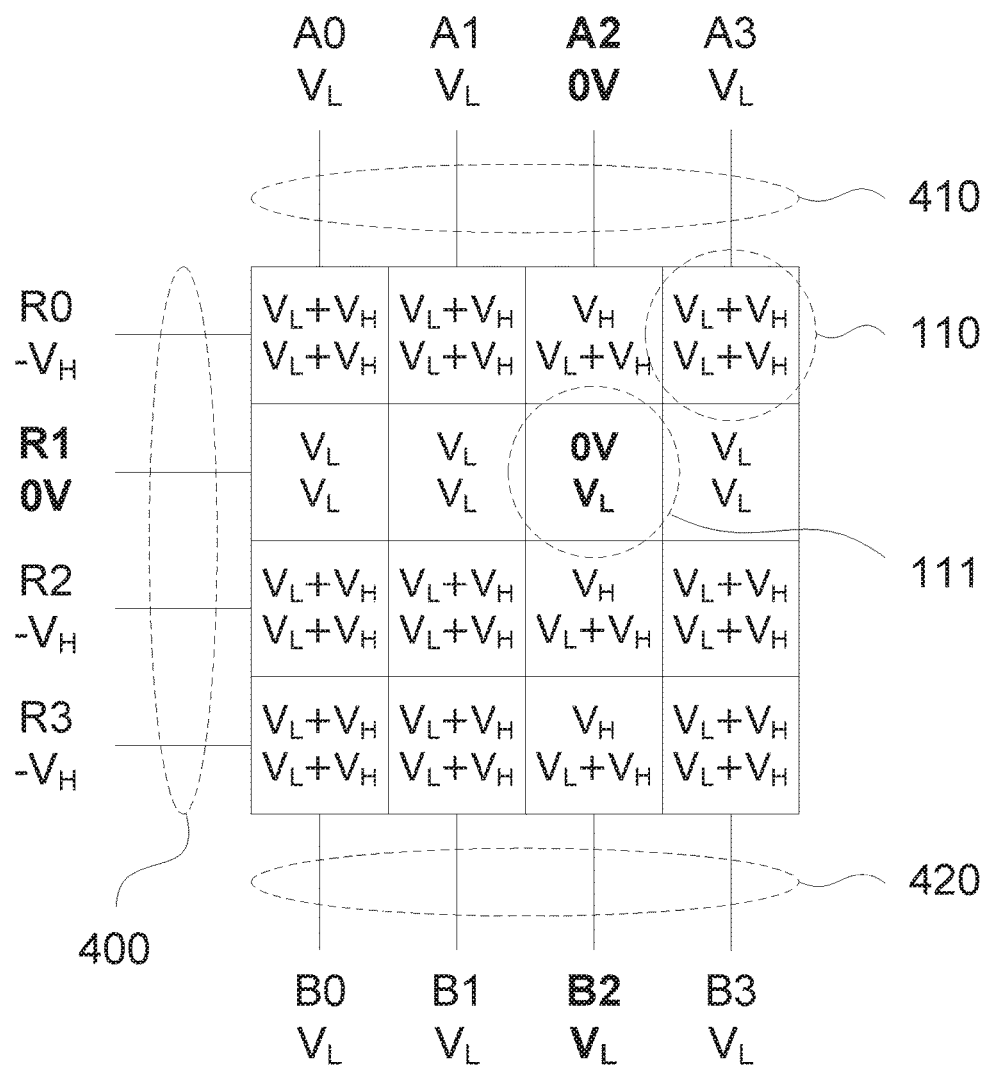

FIG. 7 illustrates the actuator array of FIGS. 4 to 6 operating according to what is referred to hereinafter as "drive scheme 3". Drive scheme 3 is characterized by:

$V_{RS}=V_{CR}=0$
$V_{RU} \leq -V_H$
$V_{CL}=V_{CU} \geq V_L$

This produces the same $V_A$ and $V_B$ as drive scheme 2 in all actuator elements.

However, compared to drive scheme 2, $V_H$ has been subtracted from the voltages applied to all R-wires, A-wires and B-wires.

It is appreciated that adding or subtracting any other given voltage from all R-wire, A-wire and B-wire voltages also results in drive schemes equivalent to drive scheme 2. Furthermore, the polarity of drive voltages in any drive scheme may be inverted without affecting the operation of the actuator array as long as $V_A$ and $V_B$ retain the same magnitude as under drive scheme 2. For example, the following drive scheme, referred to hereinafter as "drive scheme 4", is equivalent to drive schemes 2 and 3:

$V_{RS}=V_{CR} \leq -V_H$
$V_{RU}=0$
$V_{CL}=V_{CU} \leq -(V_L+V_{RS})$

Likewise, the following drive scheme, referred to hereinafter as "drive scheme 5", is equivalent to drive schemes 2 to 4:

$V_{RS}=V_{CR}=0$
$V_{RU}=V_H$
$V_{CL}=V_{CU} \leq -V_L$

FIG. 8 is a summary of drive schemes 1 to 5 in tabular form.

Figure 9:
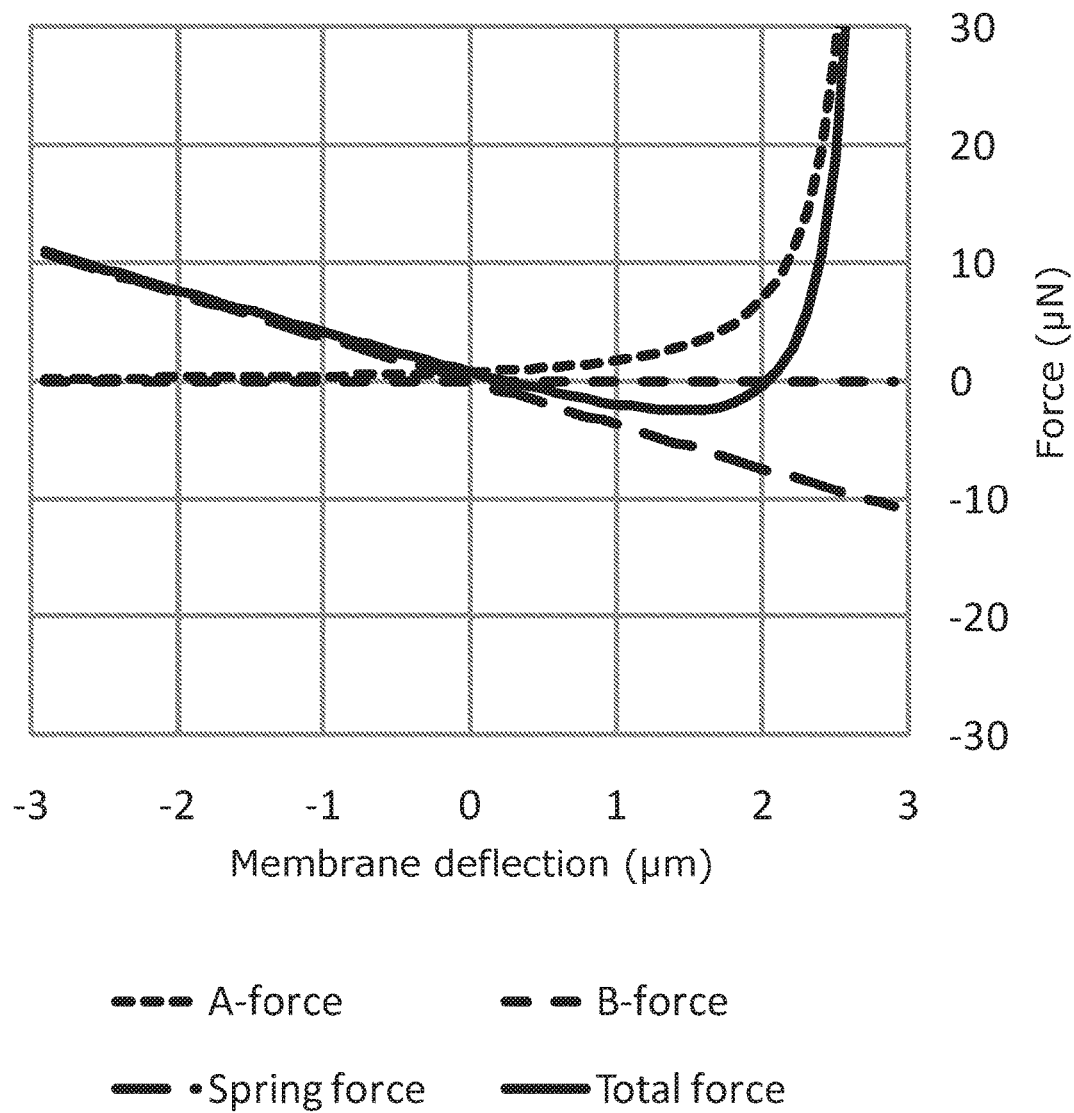
FIGS. 9 and 13 are graphs useful in understanding certain embodiments of the invention.

FIG. 9 is a graph of electrostatic and spring forces acting on a moving element 120, constructed as described with reference to FIGS. 1A to 1C, as a function of its deflection along axis 125 and towards the A-electrode 130. In the example of FIG. 9, the thickness of spacers 180 and 190 is 3 μm. The horizontal axis represents the deflection of the moving element from its resting position towards the A-electrode, with negative values indicating a deflection away from the A-electrode and towards the B-electrode. The A-force, B-force, spring force (previously defined with reference to FIGS. 1B, 1C and 1A respectively) and total force are plotted on the vertical axis.

In the example of FIG. 9, $V_B$ and hence also the B-force are zero, whereas $V_A$ is nonzero and produces a nonzero A-force. Thus the total force exerted on moving element 120 is the sum of the A-force and spring force. It can be seen that there are two equilibrium points where the total force acting on moving element 120 is zero. The first equilibrium point is close to the resting position, i.e. slightly to the right of the origin in the graph of FIG. 9, and is a stable equilibrium, i.e. if the moving element 120 is a small distance away to either side of the equilibrium point then the balance of forces acting on it will cause it to move towards the first equilibrium point. The second equilibrium point occurs closer to the A-electrode, at a deflection of approximately 2 μm, and is an unstable equilibrium. If the moving element 120 is a small distance further away from A-electrode 130 than this second equilibrium point then the balance of forces acting on it will cause it to move towards the first equilibrium point. If moving element 120 is a small distance closer to the A-electrode 130 than the second equilibrium point then the balance of forces acting on it will cause it to move towards the A-electrode and be latched in the A-position.

The drive schemes described below are suitable for embodiments in which the motion of a selected element between its two extreme positions in an actuator element may be dominated by different effects at different points in time.

Immediately after the selected element is released from its current latched position, the spring force exerted on its moving element by bearing 150 dominates its motion, propelling it towards its new location. The electrostatic force pulling moving element 120 back towards its previous latched position is zero under any of the drive schemes described above. Although the drive schemes previously discussed provide an electrostatic force attracting moving element 120 towards the latching electrode, this electrostatic force is not actually required at this time, since the desired motion can be achieved by the spring force alone. In any case, the electrostatic force, if present, is relatively weak at this time, because moving element 120 is relatively far from the latching electrode. Hence, the voltage between the latching electrode and moving element 120 ($V_{CL}$-$V_{RS}$) which produces the electrostatic force is not critical at this time, and may be altered without substantially affecting operation of the actuator array.

As the moving element 120 of the selected element approaches the latching electrode, the spring force exerted on it by bearing 150 opposes its current direction of travel and grows in magnitude. At this time, an electrostatic force attracting moving element 120 towards the latching electrode is employed to achieve latching. Hence, successful latching depends on the voltage between the latching electrode and the moving element 120 ($V_{CL}$-$V_{RS}$) being of sufficiently high magnitude to overcome the spring force as well as any other opposing forces such as friction or damping forces. On the other hand, any voltage applied between the releasing electrode and moving element 120 ($V_{CR}$-$V_{RS}$) at this time produces only a relatively small electrostatic force pulling moving element 120 back towards the releasing electrode, since moving element 120 is relatively far from the releasing electrode. Hence, the voltage $V_{CR}$-$V_{RS}$ is not critical at this time, and may be altered without substantially affecting operation of the actuator array.

In the middle portion of axis 125, around the resting position of moving element 120, both the spring force and the two electrostatic forces are relatively low in magnitude. When the moving element 120 of the selected element is in this region, it remains in motion primarily due to the momentum it acquired since being released from its previous latched position.

In the embodiments described above, one or both of the first two of the "six conditions" described previously with reference to FIG. 4 can be relaxed as follows:

$$|V_{RS}-V_{CR}| \leq V_R \text{(typically } |V_{RS}-V_{CR}|=0V) \quad 1.$$

during the early part of the movement only, i.e. during and shortly after release.

$$|V_{RS}-V_{CL}| \geq V_L \quad 2.$$

in the latter part of the movement only, i.e. during and shortly before latching.

These two conditions together with the unmodified conditions 3 to 6 of the original six conditions are referred to hereinafter as the "relaxed conditions". Based on these relaxed conditions, the movement of a moving element from one extreme position to the other (including its release from the first extreme position and latching into the second extreme position) can be split into two or more phases, such that at least one of the selected R-voltage and the selected C-voltage varies between phases.

For example, the drive scheme described below, also referred to hereinafter as "drive scheme 6", uses two phases, where the following holds:

$V_{RS}$ varies between phases as follows:
  Phase 1: $V_{RS}=V_{CR}$
  Phase 2: $V_{RS}=0$
$V_{RU}=0$ in both phases
$V_{CR} \geq V_H$ in both phases
$V_{CL}=V_{CU} \geq \max(V_L, 2 \times V_H)$ in both phases This can be viewed as a variation on drive scheme 2, the differences being that (a) the selected R-subset is selected only during Phase 1 rather than throughout as in drive scheme 2; and (b) the latching C-voltage $V_{CL}$ and unselected C-voltage $V_{cu}$ are lower than in drive scheme 2. This last point is an advantage of drive scheme 6 since it allows the controller circuit to be implemented more cost-effectively compared to drive scheme 2.

The frequency of the actuation clock (described previously with reference to FIG. 4) for drive scheme 6 is typically twice the actuation clock frequency for single-phase drive schemes such as drive schemes 1 to 5 described previously, used with the same actuator array.

Subtracting $V_H$ from all R-wire, A-wire and B-wire voltages in drive scheme 6 yields an electrically equivalent scheme referred to hereinafter as "drive scheme 7" characterized by:

$V_{RS}$ varies between phases as follows:
  Phase 1: $V_{RS}=0$
  Phase 2: $V_{RS}=V_{RU}$
$V_{RU} \leq -V_H$ in both phases
$V_{CR}=0$ in both phases
$V_{CL}=V_{CU} \geq \max(V_L, -2 \times V_{RU})+V_{RU}$ in both phases Drive scheme 7 has the advantage that the highest magnitude of drive voltage (in this case, $V_{CL}/V_{CU}$) is lower than in all other drive schemes described so far. However, it also has the disadvantage of employing both positive and negative drive voltages.

FIG. 10 is a simplified representation of an actuator array in accordance with certain embodiments of the invention, comprising eight actuator elements partitioned into four R-subsets and two C-subsets, analogously to the actuator arrays shown in FIGS. 4 to 7. R-wires are labeled R0 to R3, A-wires A0 to A1 and B-wires B0 to B1. Each square represents one actuator element 110. The actuator element located at the intersection of R-subset 1 and C-subset 1, also referred to hereinafter as the "selected element" and labeled 111, is currently latched in the A-position and is to be moved into the B-position.

The actuator array operates according to a drive scheme referred to hereinafter as "drive scheme 8", which uses two drive voltages of opposite polarities, a positive drive voltage $+V_D$ and a negative drive voltage $-V_D$. The magnitude of both drive voltages is the larger of the hold voltage $V_H$ and half of the latching voltage $V_L$ (i.e. $V_D=\max(V_L/2, V_H)$). Drive scheme 8 is further characterized by:

$V_{RS}$ varies between phases as follows:
  Phase 1: $V_{RS}=0V$
  Phase 2: $V_{RS}=V_D$
$V_{RU}=-V_D$ in both phases
$V_{CR}=0V$ in both phases
$V_{CL}=V_{CU}=+V_D$ in both phases Within each square in FIG. 10, the top line refers to the magnitude of $V_A$ and the bottom line to the magnitude of $V_B$. It can be seen that this drive scheme fulfills the "relaxed conditions" described above with reference to FIG. 9, and furthermore, offers some or all of the following advantages over drive schemes described so far:

Since $+V_D$ and $-V_D$ have the same magnitude, one can be generated from the other using a relatively simple and low-cost circuit such as an inverting charge pump; whereas in other drive schemes discussed so far, drive voltages generally differ in magnitude and hence, generating drive voltages for these drive schemes would normally employ a more complex and expensive circuit such as a switched-mode DC-to-DC converter.

If $V_H<V_L/2$, then the highest magnitude of drive voltage employed (in this case, $V_{CL}/V_{CU}$) is lower than in all other drive schemes described so far.

Drive scheme 8 is not equivalent to drive schemes 6 and 7. For example:

For unselected elements located at the intersection of selected C-wires and unselected R-wires and latched at the releasing side, the $V_A$ and $V_B$ used to hold their moving elements in their current position differs between drive schemes 6/7 and drive scheme 8, during both phases.

For unselected elements located at the intersection of unselected C-wires and unselected R-wires, the $V_A$ and $V_B$ used to hold their moving elements in their current position differs between drive schemes 6/7 and drive scheme 8, during phase 1 only.

For selected elements, the voltage between the latching wire and their moving elements differs between drive schemes 6/7 and drive scheme 8, during phase 1 only.

For selected elements, the voltage between the releasing wire and their moving elements differs between drive schemes 6/7 and drive scheme 8, during phase 2 only.

The drive schemes above may assume that, at any given time during normal operation, the controller either moves one or more actuator elements from the A-position to the B-position, or moves one or more actuator elements from the B-position to the A-position, or does not move any actuator elements. However, with drive scheme 8 it is also possible to simultaneously move one or more actuator elements from the A-position to the B-position, while also moving one or more actuator elements from the B-position to the A-position, under the following conditions:

All actuator elements to be moved are located in selected R-subsets, since moving elements can only be released if the respective R-subset is selected; and Actuator elements to be moved from their A-position to their B-position cannot be located in the same C-subset as actuator elements to be moved from their B-position to their A-position. This is because, under drive scheme 8, the latching C-voltage ($V_{CL}=+V_D$) differs from the releasing C-voltage ($V_{CR}=0V$), making it impossible for a single A-wire or B-wire to be both a latching wire and a releasing wire at the same time.

In summary, under drive scheme 8 it is possible to simultaneously move actuator elements in opposite directions, if they are all in the same R-subset but in different C-subsets.

As described previously with reference to drive schemes 3 and 6, adding or subtracting a given voltage from all R-wire, A-wire and B-wire voltages results in drive schemes that are equivalent to drive scheme 8. For example, adding $V_D$ to all R-wire, A-wire and B-wire voltages yields a variation referred to hereinafter as "drive scheme 9" characterized by $V_{RS}$ varies between phases as follows:
  Phase 1: $V_{RS}=V_D$
  Phase 2: $V_{RS}=0V$
$V_{RU}=0V$ in both phases
$V_{CR}=V_D$ in both phases
$V_{CL}=V_{CU}=2\times V_D$ in both phases Drive scheme 9 eliminates negative voltages from the controller, which, depending on the technology used to implement the controller, may reduce its cost. Since the higher drive Voltage $2\times V_D$ is exactly double the magnitude of the lower drive voltage $V_D$, it becomes possible to generate the higher drive voltage from the lower one using a relatively simple and low-cost circuit such as a voltage-doubling charge pump; whereas other drive schemes discussed so far do not generally have a 2:1 ratio between drive voltages and hence, generating drive voltages for these drive schemes would normally employ a more complex and expensive circuit such as a switched-mode DC-to-DC converter. Depending on the technology used to implement the controller circuit, the use of a doubling charge pump may reduce or increase the cost of the controller compared to using an inverting charge pump as with drive scheme 8.

It is appreciated that drive scheme 8, like all other drive schemes discussed here, can be used with actuator arrays of any size (i.e. any number of R-subsets and C-subsets, and any number of actuator elements at each intersection of an R-subset and a C-subset). The small number of R-subsets and C-subsets in FIGS. 2 to 7 and 10 have been chosen merely for simplicity. In practice, a 4×2 matrix of actuator elements as shown in FIG. 10 does not reduce the number of electrical connections between the actuator array and controller 50 compared to an implementation with dedicated connections for each moving element and two shared connections for all A-electrodes and all B-electrodes respectively; and hence there is no advantage in building such a matrix. However for larger array dimensions the number of connections is reduced dramatically (from NrNc+2 to Nr+2×Nc). It is also appreciated that the polarity of drive voltages in drive schemes 6 to 9 may be inverted without affecting operation of the actuator array, as previously described with reference to drive schemes 4 and 5. Furthermore, it is appreciated that drive schemes with more than two phases can be devised which will also fulfill the "relaxed conditions" described above with reference to FIG. 9.

In drive schemes 1 to 9, the time for releasing a moving element from one extreme position and latching it in the opposite extreme position, also referred to hereinafter as the actuation time $T_a$, is determined primarily by the mass of moving element 120 and the spring force exerted on it by bearing 150, and is approximately equal to half the resonance period $T_{res}$ of moving elements 120, where $T_{res}$ is the inverse of their mechanical resonance frequency described previously with reference to FIG. 1B. This may limit the suitability of the apparatus for specific purposes; for example, if the apparatus is used to produce sound or ultrasound waves then the actuation time $T_a$ is typically shorter than half the period of the highest sound or ultrasound frequency to be generated (according to the Nyquist sampling theorem). Furthermore, where oversampling is used (for example, in a noise-shaping loop such as that described below with reference to FIGS. 27 to 29), it is desirable to minimize the actuation time in order to increase the oversampling ratio. One way to reduce actuation time is to reduce the mass of moving element 120; however, application-specific requirements for mechanical stability and reliability may limit how far this weight can be reduced. Another option is to increase the spring coefficient of bearing 150, but this has the disadvantage of increasing the magnitude of the drive voltages employed.

For actuator arrays controlled using multi-phase drive schemes, such as drive schemes 6 to 9, an alternative approach to this problem is to overlap phases. For example, drive scheme 8 allows for the simultaneous movement of two sets of actuator elements, such that a first set of actuator elements is in Phase 1 as described above, while a second set of actuator elements is in Phase 2; a process also referred to hereinafter as "double-speed addressing". Although it does not affect the overall time to complete each movement, double-speed addressing doubles the number of opportunities per time unit for releasing moving elements. As a result, the physical effect produced by the actuator array can be controlled more accurately in time. For example, if the actuator array produces sound or ultrasound waves then the maximum frequency that can be produced is doubled; and if oversampling is used, the oversampling ratio is effectively doubled. The effect is similar to reducing the actuation time $T_a$ from $T_{res}/2$ to $T_{res}/4$, but without any change in the mechanical properties of actuator elements. However, whenever two elements are simultaneously in motion such that one is in Phase 1 and the other in Phase 2, two conditions, referred to hereinafter as the "double-speed rules", hold:

1. The two elements cannot be in the same R-subset, because drive scheme 8 applies different voltages to selected R-wires in each phase (0V in Phase 1 versus $-V_D$ in Phase 2 and for unselected R-wires).
2. If the two elements are moving in opposite directions, they are in different C-subsets. This is because drive scheme 8 applies different voltages to releasing and latching wires (0V for releasing wires versus $+V_D$ for latching wires, in both phases).

The second double-speed rule can be removed using a modified drive scheme, also referred to hereinafter as "drive scheme 10", which is characterized by:

$V_{RS}$ varies between phases as follows:
    Phase 1: $V_{RS}=0V$
    Phase 2: $V_{RS}=-V_D$
$V_{RU}=-V_D$ in both phases
$V_{CR}$ varies between phases as follows:
    Phase 1: $V_{CR}=0V$
    Phase 2: $V_{CR}=+V_D$
$V_{CL}=V_{CU}=+V_D$ in both phases Drive scheme 10 differs from drive scheme 8 in that the releasing C-voltage in Phase 2 is $+V_D$ rather than 0V, which is the same as the latching C-voltage in Phase 2. As a result, it becomes possible for an A-wire or B-wire to be the releasing wire for a moving element which is in Phase 1, while simultaneously acting as the latching wire for another moving element which is in Phase 2. However, this drive scheme may employ slightly higher drive voltages to ensure successful latching, and/or may slightly increase the time for latching under otherwise identical conditions.

FIG. 11 is a summary of drive schemes 6 to 10 in tabular form.

FIG. 12 is a summary of some further possible two-phase drive schemes. These are obtained by combining three different options (0, $+V_D$ and "don't care", i.e. either 0 or $+VD$) for $V_{CR}$ in phase 2 with the same three options for $V_{CL}$ in phase 1, yielding a total of nine possible combinations, of which seven are shown in FIG. 12 (the remaining two combinations being drive schemes 8 and 10 which are shown in FIG. 11). Each drive scheme results in a different set of "double-speed rules" (described previously for drive schemes 8 and 10). Some of the drive schemes shown may employ a slight adjustment of $V_D$ to ensure successful release and latching.

Drive schemes containing "don't care" conditions such as drive schemes 11, 14, 15, 16 and 17, where one or both of $V_{CR}$ and $V_{CL}$ may be either 0 or $+V_D$ in the same phase, offer more degrees of freedom in selecting R-wire, A-wire and B-wire voltages to produce a desired physical effect. As a result, such drive schemes may enable more accurate production of the desired physical effect, and/or may simplify the process of determining the R-wire, A-wire and B-wire voltages. However, the physical effect produced by actuator elements under such drive schemes may vary slightly depending on whether the respective voltage is 0 or $+V_D$. Depending on the application, this variation may or may not represent a disadvantage outweighing the advantage of higher accuracy.

"Double-speed addressing" has been described previously with reference to FIG. 10. In some embodiments, the method may be extrapolated, e.g. to achieve higher-than-double speed addressing, and generalized to triple, quadruple, or k-tuple speed addressing. k-tuple speed addressing in accordance with certain embodiments of the present invention uses a drive scheme with k phases (where k is a positive integer), and an actuation clock k times faster than for a single-phase drive scheme with the same actuator array, to effect movement of a moving element from one of its extreme positions to the opposite extreme position. Potentially useful drive schemes derived from drive scheme 8 share some or all of the following features:

$V_{RS}=0$ in the first phase and $-V_D$ in the last phase.
$V_{RD}=-V_D$ in all phases.
$V_{CR}=0$ in the first phase.
$V_{CL}=+V_D$ in the last phase.
$V_{CU}=+V_D$ in all phases.

Differences between these drive schemes include one or more of:

the value of $V_{RS}$ in intermediate phases (i.e. any phases which are neither the first nor the last); possible values include 0, $-V_D$ and "don't care" (i.e. either 0 or $-V_D$)
the value of $V_{CR}$ in phases other than the first phase; possible values include 0, $+V_D$ and "don't care" (i.e. either 0 or $+V_D$)
the value of $V_{CL}$ in phases other than the last phase; possible values include 0, $+V_D$ and "don't care" (i.e. either 0 or $+V_D$)

As an example, one possible quadruple-speed drive scheme, referred to hereinafter as "drive scheme 18", is characterized by:

$V_{RS}$ varies between phases as follows:
    Phases 1 and 2: $V_{RS}=0V$
    Phases 3 and 4: $V_{RS}=N_D$
$V_{RU}=-V_D$ in all phases
$V_{CR}$ varies between phases as follows:
    Phases 1 to 3: $V_{CR}=0V$
    Phase 4: $V_{CR}=0V$ or $+V_D$ ("don't care")
$V_{CR}$ varies between phases as follows:
    Phase 1: $V_{CR}=0V$ or $+V_D$ ("don't care")
    Phase 4: $V_{CR}=+VD$
$V_{CU}=+V_D$ in all phases As described previously with reference to FIG. 10, the key advantage of higher-speed addressing is that the physical effect produced by the actuator array can be controlled more accurately in time. On the other hand, higher-speed addressing also complicates the process of determining R-wire, A-wire and B-wire voltages to produce a desired physical effect (referred to hereinafter as an "addressing method"). With double-speed or higher-speed addressing methods, the R-wire, A-wire and B-wire voltages for each actuation clock cycle are typically chosen such that any moving elements released in previous actuation lock cycles, bit not yet latched in their new position, are correctly latched; whereas with single-speed addressing methods, there is no such constraint on the selection of R-wire, A-wire and B-wire voltages, since all movements are completed within a single actuation clock cycle. As a result, double-speed or higher-speed addressing methods typically have fewer degrees of freedom available at each actuation clock cycle tom prodice the desired physical effect. Depending on the application, this potential disadvantage may or may not outweigh the advantage of higher-speed addressing.

It is appreciated that adding or subtracting any given voltage from all drive voltages in any higher-speed drive scheme, or inverting the polarity of all drive voltages, results in drive schemes that are electrically equivalent to the original drive scheme. Furthermore, it is appreciated that higher-speed drive schemes may also be devised using asymmetric drive voltages (for example, as a higher-speed version of drive schemes 6 or 7 presented previously), or using more than two nonzero drive voltages (for example, as a higher-speed version of drive scheme 1 presented previously).

FIG. 13 is a graph of voltage waveforms for initialization of one or more actuator elements in an actuator array using the previously described drive scheme 8, and the resulting deflection of moving element 120 from its resting position.

"Initialization" herein refers to a process of latching some or all actuator elements within an array of electrostatic actuators, such as those described previously with reference to FIGS. 2 to 4, into one of their extreme positions, for example, immediately after power-up. Since moving elements are in equilibrium at their resting position when the apparatus is powered down, the initialization process typically achieves latching from the resting position; whereas during normal operation, moving elements are always latched into a new extreme position after having been previously latched in, and then released from, the opposite extreme position. The latching voltage $V_L$ defined previously with reference to FIG. 3 is sufficient only to achieve latching in the latter case but not from the resting position. As a result, the above drive schemes, which typically generate a voltage equal to $V_L$ between moving elements and latching electrodes, are not necessarily capable of latching moving elements directly from their resting positions; this is typically first achieved in a separate initialization procedure before these drive schemes can be used.

One possible solution is to increase the magnitude of the selected R-voltage and/or the latching C-voltage such that the magnitude of the resulting voltage between latching electrodes and moving elements becomes sufficiently large to latch moving elements directly from their resting positions. However higher drive voltages may make the controller circuit more costly to implement and/or increase the power consumption of the apparatus during normal operation. Another possible solution is to use higher drive voltages for initialization only and revert to lower drive voltages for normal operation. However, the additional voltages may add complexity to the controller. For example, a controller operating according to drive scheme 8 is typically only capable of applying one of two drive voltages (0 or $-V_D$) to each R-wire and one of two drive voltages (0 or $+V_D$) to each A-wire and B-wire, whereas a modified version with additional higher drive voltages would have to switch R-wires and/or A-wires and B-wires between three different voltages.

The initialization procedure illustrated in FIG. 13 takes advantage of the moving elements' mechanical resonance and as a result, does not employ higher or additional drive voltages. In FIG. 13, $T_{Res}$ refers to the resonance period of moving elements 120, i.e. the inverse of their mechanical resonance frequency described previously with reference to FIG. 1B; $V_{CSA}$ refers to the voltage applied to selected A-wires, i.e. A-wires of C-subsets containing actuator elements to be initialized; likewise, $V_{CSB}$ refers to the voltage applied to selected B-wires; and $V_{RS}$ refers to the voltage applied to selected R-wires, i.e. those of R-subsets containing actuator elements to be initialized. In the bottom part of the graph, the deflection of a typical moving element 120 away from its resting position and towards the A-position is plotted over time.

The initialization procedure illustrated in FIG. 13 typically comprises first and second phases. In the first phase, the controller applies a voltage of 0V to selected R-wires, and the negative drive voltage $-V_D$ to any other R-wires, also referred to hereinafter as unselected R-wires (i.e. $V_{RS}=0$, $V_{RU}=-V_D$). At the same time, the controller alternately sets $V_{CSA}$ and $V_{CSB}$ to the positive drive voltage $+V_D$ and 0V respectively, switching between these voltages periodically such that whenever $+V_D$ is applied to a selected A-wire, 0V is applied to the respective B-wire and vice versa, creating two square waves whose frequency is substantially equal to the mechanical resonance frequency described with reference to FIG. 1B of moving elements 120, and which are 180 degrees out of phase; while also constantly applying the positive drive voltage $+V_D$ to any other A-wires and B-wires. This causes moving element 120 to oscillate around its resting position, with the amplitude of the oscillation gradually increasing over time. In certain embodiments, the duration of this first phase is substantially equal to an integer multiple of half the resonance period $T_{res}$ of moving element 120, plus one quarter of the resonance period (i.e. $T_{phase1} \approx (0.5 \times Ni+0.25) \times T_{res}$, where Ni is an integer), and just sufficiently long to allow maximum oscillation amplitude to be reached. Thus, at the end of the first phase, the moving element 120 is near its resting position and travelling towards one of the two electrodes (in the case of FIG. 13, towards the A-electrode). In the simulated example shown in FIG. 13, the duration of the first phase is six and a quarter resonance periods, i.e. Ni=12. However, it is appreciated that the optimum Ni depends on mechanical properties and damping of the actuator element. In the second phase of the initialization procedure, the controller applies the negative drive voltage $-V_D$ to all R-wires including selected R-wires, while keeping all A-wires and B-wires constantly at the same voltage applied to them at the end of the first phase.

The change in $V_{RS}$ from the first phase to the second increases the voltage between moving element 120 and the latching electrode (i.e. the electrode towards which it is travelling) such that the resulting electrostatic force combined with the moving element's momentum is sufficient to overcome the spring force exerted by bearing 150, allowing moving element 120 to reach a position close enough to the latching electrode to achieve latching into one of the two extreme positions as described with reference to FIG. 1B (in the case of FIG. 13, the A-position). The duration of this second phase is typically sufficient to achieve latching, typically between half a resonance period and a full resonance period. For an initialization procedure to latch moving elements into the B-position rather than the A-position, the procedure is as described above, with the waveforms for $V_{CSA}$ and $V_{CSB}$ reversed. It is also possible latch moving elements of some C-subsets into the A-position and those of other C-subsets into the B-position simultaneously in a single initialization, by applying different waveforms different waveforms to the respective A-wires and B-wires.

Similar initialization procedures can be devised for other drive schemes described previously. For example, adding $V_D$ to all R-wire, A-wire and B-wire voltages yields an initialization procedure using only the drive voltages already present in drive scheme 9.

It is appreciated that there need not be any unselected R-subsets or C-subsets during initialization; if all moving elements within the actuator array have substantially the same mechanical resonance frequency, the entire array can be initialized at the same time. On the other hand, in an actuator array where mechanical resonance frequencies vary substantially, the initialization procedure may be repeated several times with signal timing adjusted to the different mechanical resonance frequencies. It is also appreciated that the initialization procedure can also be used at times other than after power-up, for example, in order to return to a well-defined position any moving elements which may previously have failed to latch, for example, as a result of unusually strong mechanical shock.

FIG. 14 is a simplified block diagram of one embodiment of the present invention, comprising a controller 50 and actuator array 100. This particular embodiment relies on the assumption that the physical effect produced by the moving elements within the actuator array 100 is determined primarily by the number of moving elements in each extreme position at any point in time, and that variations in the physical effect depending on which particular moving elements are in each extreme position are either negligible or not relevant to the application where the apparatus is used; or alternatively, that the physical effect is determined primarily by the number of moving elements moving from one extreme position to the other at any point in time, regardless of which particular moving elements execute the movement. The latter is true, for example, where the physical effect produced by an individual actuator element is a pressure pulse, the overall physical effect produced by the entire apparatus is audible sound, and the physical size of the actuator array is significantly smaller than the wavelength of the highest audio frequencies being reproduced (with larger or more widely spaced actuator arrays, the resulting audible sound may be directional, as described in WO2007/135678 ("Direct digital speaker apparatus having a desired directivity pattern")). In that case, the entire apparatus is essentially a digital-to-analog converter (DAC) whose analog output is sound pressure (rather than voltage or current, like most DACs).

The controller 50 receives a digital audio signal 600 which is sampled periodically, and adjusts the voltages applied to R-wires 400, A-wires 410 and B-wires 420, causing the actuator elements within actuator array 100 to move between their two extreme positions and thereby reproduce an audible sound represented by audio signal 70. In this particular embodiment, the controller 50 comprises a low-pass filter 510, a sample-rate converter 520, a scaler 530, a quantizer 540, an element selector 550, and a high-voltage driver 560 e.g. as described below.

The low-pass filter (LPF) 510 receives digital audio signal 600 and produces a low-pass filtered signal 610. The purpose of the LPF is volume control. LPFs are well known in the art, but are not generally used for volume control in sound reproduction systems based on conventional loudspeakers. In sound reproduction systems based on actuator arrays, however, using an LPF rather than conventional methods for volume control can be advantageous because it can result in improved bass response at low volumes. This is described in detail in WO2007/135679 ("Systems and Methods for Volume Control in Direct Digital Speakers").

The LPF is optional and may be omitted if there is no need for volume control, or if volume control is to be effected by conventional methods despite the disadvantage of poorer bass response at low volumes. Alternatively, the LPF may be implemented in another part of a larger system into which the entire apparatus is embedded; for example, it may run as a signal-processing algorithm in a multimedia processor IC (integrated circuit) in a consumer electronics device. As described in Published PCT Application WO2007/135679 ("Systems and Methods for Volume Control in Direct Digital Speakers"), the LPF typically has a slope of 6 dB/octave above its corner frequency. Other characteristics of the LPF described in the above-referenced application are not critical to the invention.

The sample rate converter (SRC) 520 matches the sample rate of the low-pass filtered signal 610 to the actuation clock frequency at which element selector 550 operates, producing a resampled signal 620. The sample rate of the digital audio signal 600 and thus of the low-pass filtered signal 610 depends on the application. For example, digital telephony typically uses sample rates of 8 kHz or 16 kHz, whereas commonly used sample rates for digital music reproduction in consumer audio devices include 44.1 kHz and 48 kHz. The actuation clock frequency, on the other hand, is dictated by the mechanical properties of the actuator elements and the number of phases used in the drive scheme (k), as described previously with reference to FIGS. 4, 9 and 12, and is typically not equal to (typically higher than) typical sample rates for digital audio content, therefore sample rate conversion is employed. Sample rate conversion is well known in the art, and implementation details while they may affect overall sound fidelity of the apparatus, are not critical. The SRC is optional and may be omitted if the audio signal 600 is delivered to the controller 50 at a sample rate that equals the actuation clock rate. It may also be implemented in another part of a larger system into which the entire apparatus is embedded.

The scaler 530 matches the range of the resampled signal 620 to the resolution of the actuator array 100, producing a scaled signal 630 which directly represents the number of actuator elements that should be in the A-position (or alternatively, the number of elements that should be in the B-position at any given time in order to produce the desired sound. For example, the digital audio signal may be in two's complement format with 16-bit resolution, such that its value can vary between −32768 and +32767. The range of actuator array 100, on the other hand, is equal to the number of actuator elements it contains, plus one. For example, in an actuator array with 32 R-subsets and 32 C-subsets, containing 1024 actuator elements, the number of moving elements in the A-position can take 1025 different values (from 0 to 1024; likewise for the B-position). The range of the actuator array is typically lower than that of the resampled signal, therefore scaling is employed. Scaling is typically achieved by multiplying the resampled signal with a first constant and adding a second constant. In the example above, the first constant may be 1/64 and the second constant 512. The scaler is optional and may be omitted if the ranges of resampled signal 620 and actuator array 100 match.

The quantizer 540 quantizes the scaled signal 630, taking account of the fact that the number of moving elements in the A-state (or B-state) is always an integer. Its output is a quantized signal 640, which takes only integer values. Quantization is well known in the art. The quantized signal may, for example, be a truncated version of the scaled signal 630, discarding the fractional part. Alternatively, the quantizer may use dithering, to improve performance of the apparatus. Dithering is well known in the art, and is commonly used, inter alia, in analog-to digital and digital-to-analog converters. Dithering may be achieved, for example, by adding a pseudo-random signal with a rectangular or triangular probability distribution function (PDF) to the scaled signal 630 before truncation. The quantizer is optional and may be omitted, for example, if the resolution of the resampled signal 620 is less than or equal to that of actuator array 100.

The element selector 550 receives the quantized signal 640 and determines from it the array drive signals 650, indicating which of the drive voltages is to be applied to each R-wire, A-wire and B-wire at any point in time in order to make the number of actuator elements in the A-position (or alternatively, the number of elements in the B-position) equal to, or as close as possible to, the number represented by the quantized signal 640. Methods for moving one or more specific actuator elements between their two extreme positions, i.e. drive schemes, have been described previously with reference to FIGS. 4 to 12. Depending on the state of each actuator element and on the quantized signal at any given time, there may be more than one way of obtaining the desired number of moving elements in the A-position (or in the B-position). Hence, various different element selection methods may be employed to determine which specific actuator elements to select at any given point in time. Element selection methods are described below with reference to FIGS. 15 to 24.

The high-voltage driver 560 translates the voltage levels of drive signals 650 to the drive voltages employed by the actuator array 100 under whichever drive scheme is used, and applies these drive voltages to R-wires 400, A-wires 410 and B-wires 420. The high-voltage driver may be implemented, for example, as a plurality of conventional level-shifting circuits. Depending on the mechanical dimensions of actuator elements, drive voltages may have magnitudes of tens or hundreds of volts, whereas digital electronic circuits typically use supply voltages well below 10 volts. Furthermore, all drive schemes described above with reference to FIGS. 5 to 12 employ at least three different drive voltages (for example, drive scheme 8 described with reference to FIG. 10 has $+V_D$ and 0 for A-wires and B-wires, and $-V_D$ and 0 for R-wires), whereas digital circuitry generally uses only two distinct levels (logic high/low). For example, if drive scheme 8 is used, "high" and "low" outputs from the element selector 550 may be translated to $-V_D$ and 0 respectively for R-wires, and to $+V_D$ and 0 respectively for A-wires and B-wires. Therefore, level shifting is employed. Level shifting circuits are known in the art.

It is understood that the functions of low-pass filtering, sample rate conversion and scaling need not be performed in the order shown in FIG. 14, and may be performed in any order without affecting the functionality of the apparatus. Furthermore, the components of FIG. 14 may be physically partitioned in different ways. For example, and without limitation, each of the LPF, SRC, quantizer and element selector may be implemented as an algorithm running on a general-purpose microprocessor or microcontroller or on a digital signal processor (DSP), or as a hard-wired electronic circuit. Any electronic circuits forming part of the controller 50 may or may not be integrated into one or more integrated circuits (ICs), and may be co-packaged with actuator array 100, with other system components, or implemented as a standalone component.

FIGS. 15 to 23 are simplified flowchart illustrations of processes together forming an element selection method which may be used in an element selector in an apparatus such as that of FIG. 14. The element selection method of FIGS. 15 to 23 is based on the previously described drive scheme 8, i.e. it assumes that movements of moving elements from one extreme position to the other are completed within 2 actuation clock cycles. It is appreciated that mutatis mutandis, other drive schemes may alternatively be used as a basis.

The method of FIG. 15 typically comprises some or all of the following steps, suitably ordered e.g. as shown:

Step 1510: Perform initialization procedure as described with reference to FIG. 13, leaving some (typically half) of all C-subsets with all their moving elements in the A-position ("full"), and the other C-subsets with all their elements in the B-position ("empty"). The initialization procedure finishes with all R-signals, A-signals and B-signals "off".

Step 1520: Choose a number d (e.g. any arbitrary number) such that there exists an R-subset numbered d.

Step 1530: Choose a number e (e.g. any arbitrary number) such that the C-subsets numbered e is empty.

Step 1540: Choose a number f (e.g. any arbitrary number) such that there exists an R-subset numbered f.

Step 1550: Choose a number g (e.g. any arbitrary number) such that the C-subset numbered g is full.

Step 1560: Initialize internal variable Na to the number of moving elements currently in the A-position Step 1570: Execute main loop (e.g. as per FIG. 16) once per actuation clock cycle The method of FIG. 16 typically comprises some or all of the following steps, suitably ordered e.g. as shown:

Step 1610: Compute the difference net_moves between the element selector input signal (representing the number of moving elements that should be in the A-position to produce the desired physical effect) and the actual number of elements in the A-position (internal variable Na)

Step 1620: If net_moves is zero perform method of FIG. 23

Step 1630: If net_moves is positive perform method of FIG. 17

Step 1640: If net_moves is negative perform method of FIG. 18

Step 1650: Return to step 1610 at the next actuation clock cycle

The method of FIG. 17 typically comprises some or all of the following steps, suitably ordered e.g. as shown:

Step 1710: If any A-signal, or any B-signal other than b(e) was "on" during the last actuation clock cycle: see FIG. 23.

Step 1720: If no A-signal, nor any B-signal other than b(e) was "on" during the last actuation clock cycle, perform some or all of the following operations:

A: Turn b(e) "on", and all other A-signals and B-signals "off".

B: If any R-signal numbered between d and d+net_moves−1 was "on" during the previous actuation clock cycle: perform method of FIG. 18

C: If no R-signal numbered between d and d+net_moves−1 was "on" during the previous actuation clock cycle: perform method of FIG. 19

Step 1730: Increment Na by the number of R-signals that are currently "on"

Step 1740: Jump to step 1650 in main loop (e.g. as per FIG. 16)

The method of FIG. 18 typically comprises some or all of the following steps, suitably ordered e.g. as shown:

Step 1810: Turn "on" any R-signals numbered from d up to and including the lowest-numbered R-signal which was "off" during the previous actuation clock cycle (if any).

Step 1820: Turn all other R-signals "off"

Step 1830: Increment d by the number of R-signals that are currently "on"

Step 1840: Jump to step 1730 in FIG. 17

The method of FIG. 19 typically comprises some or all of the following steps, suitably ordered e.g. as shown:

Step 1910: If d+net_moves >Nr, perform some or all of the following operations:

A: Turn "on" all R-signals numbered from d up to and including Nr−1.

B: Turn all other R-signals "off"

C: Set d=0

D: If e=Nc−1, set e=0; otherwise increment e by one

Step 1920: If d+net_moves−1<Nr, perform some or all of the following operations:

A: Turn "on" all R-signals numbered from d up to and including d+net_moves−1.

B: Turn all other R-signals "off"

C: Increment d by net_moves.

Step 1930: Jump to step 1730 in FIG. 17

The method of FIG. 20 typically comprises some or all of the following steps, suitably ordered e.g. as shown:

Step 2010: If any B-signal, or any A-signal other than a(g) was "on" during the last actuation clock cycle, perform method of FIG. 23.

Step 2020: If no B-signal, nor any A-signal other than a(g) was "on" during the last actuation clock cycle, perform some or all of the following operations:

A: Turn A(g) "on", and all other A-signals and B-signals "off".

B: If any R-signal numbered between f and f-net_moves−1 was "on" during the previous actuation clock cycle: perform method of FIG. 21

C: If no R-signal numbered between f and f-net_moves−1 was "on" during the previous actuation clock cycle: perform method of FIG. 22

Step 2030: Decrement Na by the number of R-signals that are currently "on"

Jump to step 1650 in main loop (FIG. 16)

The method of FIG. 21 typically comprises some or all of the following steps, suitably ordered e.g. as shown:

Step 2110: Turn "on" any R-signals numbered from f up to and including the lowest-numbered R-signal which was "off" during the previous actuation clock cycle (if any).

Step 2120: Turn "off" all other R-signals

Step 2130: Increment f by the number of R-signals that are currently "on" step 2140: Jump to step 2030 in FIG. 20

The method of FIG. 22 typically comprises some or all of the following steps, suitably ordered e.g. as shown:

Step 2210: If f-net_moves >Nr:

A: Turn "on" all R-signals numbered from f up to and including Nr−1.

B: Turn "off" all other R-signals

C: Set f=0

D: If g=Nc−1, set g=0; else increment g by one

Step 2220: If f-net moves <Nr, perform some or all of the following operations:

A: Turn "on" all R-signals numbered from f up to and including f-net_moves−1.

B: Turn "off" all other R-signals

C: Increment f by net_moves.

Step 2230: Jump to step 2030 in FIG. 20

The method of FIG. 23 typically comprises some or all of the following steps, suitably ordered e.g. as shown:

Step 2310: Turn "off" all R-signals

Step 2320: If Na was changed during the previous actuation clock cycle, perform some or all of the following operations:

A: Keep "on" any A-signal or B-signal to which was "on" during the previous actuation clock cycle.

B: Turn "off" all other A-signals and B-signals

Step 2330: If Na was not changed during the previous actuation clock cycle, turn "off" all A-signals and all B-signals.

Step 2340: Return.

Generally, the element selection method of FIGS. 15 to 23 receives a single input signal sampled in accordance with the actuation clock, which may for example be the output of a quantizer such as signal 640 in FIG. 14. For an actuator array with Nr R-subsets and Nc C-subsets, the element selection method of FIGS. 15 to 23 assumes that each R-subset contains Nc moving elements and each C-subset contains Nr moving elements. The method produces Nr+2×Nc single-bit array drive signals: Nr R-signals, numbered r0 to r(Nr−1) indicating the voltage to be applied to each R-wire of the actuator array; Nc A-signals, numbered a0 to a(Nc−1) indicating the voltage to be applied to each A-wire; and Nc B-signals, numbered b0 to b(Nc−1) indicating the voltage to be applied to each A-wire. These may, for example be fed to a high-voltage driver as shown in FIG. 14. It is assumed that each of these signals controls the respective R-wire, A-wire and B-wire with the same number. When a signal is "on", the voltage applied to the respective wire is 0V; when it is "off", that voltage is −VD (for R-wires) or +VD (for A-wires and B-wires).

The number of elements in the A-position at each actuation cycle in an actuator array controlled by the element selection method of FIGS. 15 to 23 closely approximates the method's input signal if:

1. e never becomes equal to g (e and g are defined in FIG. 15), and
2. the slew rate of the method's input signal is less than Nr/2 per actuation clock cycle.

If e and g become equal, the controller might apply 0V to both the A-wire and the B-wire of a single C-subset, which is disallowed under drive scheme 8 because it would cause moving elements in that C-subset to be released from one extreme position without being latched in the other extreme position. E and g can be prevented from becoming equal, for example, by ensuring that at least one C-subset is "full" (i.e. has all its moving elements in the A-position) and at least one C-subset is "empty" (all moving elements in the B-position) at all times. In an apparatus as shown in FIG. 14, this may be achieved, for example, by designing the scaler 530 such that the value of quantizer output signal 640 (i.e. the input to the element selection method of FIGS. 15 to 23) is always above Nr and below Nr×(Nc−1). Alternatively, the input signal may be limited elsewhere, e.g. within an improved version of the element selection method of FIGS. 15 to 23 itself.

The slew rate limitation of the element selection method of FIGS. 15 to 23 accrues because the element selection method of FIGS. 15 to 23 never releases moving elements within more than one C-subset in the same actuation clock cycle. As long as the input signal does not increase or decrease by more than Nr/2 per actuation clock cycle, the number of elements in the A-position, while not necessarily exactly equal to the input signal at every actuation clock cycle, still closely approximates it. If the input signal changes faster, the difference between the input signal and the number of elements in the A-position (referred to hereinafter as "addressing error") may accumulate over more than two actuation clock cycles. In such cases, the element selection method of FIGS. 15 to 23 enters a repetitive two-cycle pattern where, every other cycle, an entire C-subset of moving elements is released from an extreme position, followed by a cycle where no moving elements are released and the previously released ones are latched. Short bursts of this two-cycle pattern may also occur if the slew rate is below Nr/2 but close to it.

The element selection method of FIGS. 15 to 23 executes only a small number of steps during each actuation clock cycle, and employs only a small amount of memory. Its stored data comprises the variables d, e, f, g, Na, and the previous values of its own outputs, i.e. of array drive signals r0 to r(Nr−1), a0 to a(Nc−1) and b0 to b(Nc−1). The element selection method of FIGS. 15 to 23 does not keep track of the position of each moving element individually, since this information is implied by the internal variables d, e, f and g.

It is appreciated that element selection methods similar to the element selection method of FIGS. 15 to 23 can also be devised for other drive schemes, such as drive schemes 1 to 7 and 9 to 18 described previously (logical supersets of drive scheme 8, e.g. drive schemes 11, 15 and 17, support the element selection method of FIGS. 15 to 23 as-is). The complexity of such similar methods is a function of the number of different voltages, and of the number of phases (k) used in the drive scheme. Similar methods for use with single-phase drive schemes, such as drive schemes 1 to 5 described previously, typically execute fewer steps per actuation clock cycle than the element selection method of FIGS. 15 to 23 because all moving elements released during one actuation clock cycle are already latched before the next actuation clock cycle begins. Conversely, similar methods for use with higher-speed drive schemes, such as for example the four-phase drive scheme 18, typically execute more steps per actuation clock cycle than the element selection method of FIGS. 15 to 23, because under higher-speed drive schemes, the release of any moving elements during one actuation clock cycle creates a requirement to latch the released moving elements in the opposite extreme position three actuation clock cycles later, requiring specific voltages on certain R-wires, A-wires and B-wires and thereby reducing the degrees of freedom available to the controller.

It is appreciated furthermore, that it is also possible, for any given drive scheme, to devise element selection methods bearing no resemblance to the element selection method of FIGS. 15 to 23. For example, a "brute-force" method may compute the position of each moving element at the next clock cycle for every possible combination of array drive signal values allowed by the drive scheme, and select an optimal combination of array drive signal values according to criteria such as the addressing error produced, and/or other criteria which may be relevant in a given application.

FIG. 24 is a simplified representation of an actuator array in accordance with certain embodiments of the invention, comprising 64 actuator elements partitioned into eight R-subsets and eight C-subsets, analogously to the actuator arrays shown in FIGS. 2 and 4. R-wires are labeled R0 to R7, A-wires A0 to A7 and B-wires B0 to B7. Each square represents one actuator element.

In FIG. 24, the actuator elements are numbered according to the formula:

element number=number of R−subsets×C−subset number+R−subset number and labeled in FIG. 24 in hexadecimal notation. Twenty-two moving elements, shaded in FIG. 24 and numbered 16 to 2B, are in the A-position and the remaining moving elements, not shaded in FIG. 24, are in the B-position.

This is a typical situation for an actuator array controlled by the element selection method of FIGS. 15 to 23. In this example, the values of internal variables in the element selection method of FIGS. 15 to 23 are:

Na=22
d=4
e=5
f=6
g=2

It can be seen in FIG. 24 that the numbers of the set of moving elements in the A-position (referred to hereinafter as the "A-set") form a continuous sequence, running from 16 to 2B (in hexadecimal notation as per FIG. 24). Likewise, the numbers of the set of moving elements in the B-position (referred to hereinafter as the "B-set") also form a continuous sequence, running from 2C to 15, wrapping around from 3F (the highest-numbered moving element) back to 00. The element selection method of FIGS. 15 to 23 has the property that both the A-set and the B-set always form such continuous sequences which may or may not wrap around from the highest-numbered moving element to the lowest-numbered one (referred to hereinafter as a "continuous wraparound sequence"). The element selection method of FIGS. 15 to 23 relies on this property to keep track of the positions of the moving elements without employing an Nr×Nc matrix data structure.

In the situation of FIG. 24, if the value of the input to the element selection method of FIGS. 15 to 23 increases, the next moving elements to be released from the B-position are 2C, 2D, 2E etc., in ascending order according to their numbering. Likewise, if the value of the input to the element selection method of FIGS. 15 to 23 decreases, the next moving elements to be released from the A-position are 16, 17, 18 etc., in descending order according to their numbering. In certain applications, it may be undesirable for the element selection method to always release moving elements in the same order, as is the case for the element selection method of FIGS. 15 to 23. One reason for this is mismatch noise resulting from mismatch errors, i.e. differences in the magnitude of the physical effect produced by each moving element, which may result, for example, from manufacturing tolerances, or from moving elements being mechanically damaged at some time after their manufacture. If moving elements are always released in the same order, the spectrum of such mismatch noise (depending on the input signal) may be such that mismatch noise energy is concentrated at certain frequencies not contained in the input signal. This phenomenon is well known in sigma-delta digital-to-analog converters, and may cause audible sound reproduced by such digital-to-analog converters to contain audible tones not present in the input signal. Various method are known in the art for shaping the frequency spectrum of mismatch noise to, for example, make mismatch noise less audible or even inaudible in audio applications. One such method, commonly referred to as "data-weighted averaging" (DWA), distributes mismatch noise energy approximately evenly across the frequency spectrum, i.e. "whitens" it. An element selection method according to certain embodiments of the present invention may implement DWA by releasing 2×net_moves moving elements from the A-position and net_moves moving elements from the B-position in actuation clock cycles where net_moves is positive, and releasing 2×net_moves moving elements from the B-position and net_moves moving elements from the A-position in actuation clock cycles where net_moves is positive. However, due to the fact that that typically, electrical connections are shared between actuator elements in actuator arrays, rather than each electrical connection being dedicated to one particular element as is typically the case in conventional digital-to-analog converters, such element selection methods implementing DWA may be complex (i.e. execute a large number of steps at each actuation clock cycle), and/or the number of elements in the A-position at each actuation cycle in an actuator array controlled by such an element selection method may approximate the method's input signal less closely than with element selection methods not implementing DWA.

Methods for "whitening" the frequency spectrum of mismatch noise, which can be used directly with the element selection method of FIGS. 15 to 23 and methods based upon the element selection method of FIGS. 15 to 23, are now described. The method of FIGS. 15 to 23 assumes that each of the R-signals r0 to r(Nr−1), A-signals a0 to a(Nc−1) and B-signals b0 to b(Nc−1) controls the respective R-wire, A-wire or B-wire of the actuator array. However, if these assignments are altered such that, for example, R-signal T4 controls an R-wire other than R4, or A-signal a0 and B-signal b0 control an A-wire other than A0 and a B-wire other than B0 respectively, then the order in which the element selection method of FIGS. 15 to 23 releases moving elements is changed. By repeatedly (for example, once per actuation clock cycle) making such changes to the assignment of array drive signals to R-wires, A-wires and B-wires, the order in which moving elements are released becomes pseudo-random, thus distributing mismatch noise energy more evenly across the frequency spectrum.

In the following examples, R'(i) denotes the R-wire currently controlled by R-signal r(i), A'(i) denotes the A-wire currently controlled by A-signal a(i), and B'(i) denotes the B-wire currently controlled by B-signal b(i). In the situation depicted in FIG. 24, R-signals r4 and r5 may be swapped, such that r4 controls R'5 (which in this case, is R5) and r5 controls R'4 (in this case, R4), without affecting the position of any moving element in the actuator array. After swapping r4 and r5, the next moving element to be released from the B-position is 2D, whereas before the swap, it was 2C. Likewise, r6 and T7 may be swapped such that r6 controls R'7 and r7 controls R'6, resulting in moving element 17, rather than 16, becoming the next moving element to be released from the A-position. Any two of R-signals r0 to r3 may also be swapped without affecting the position of any moving element in the actuator array. Overall, in the situation depicted in FIG. 24 there are three sets of R-signals within which any member can be swapped with any other: {r0,r1,r2,r3}, {r4,r5}, and {r6,r7}. However, swapping any R-signal from one of these sets with any R-signal from another set may disrupt the operation of the element selection method of FIGS. 15 to 23, resulting in the apparatus no longer producing the desired physical effect. A-signals and B-signals may be swapped analogously. For example, in the situation depicted in FIG. 24, A-signals a6 and a1 may be swapped by changing output assignments such that a6 controls A'1 (which in this case, is A1), and a1 controls A'6 (in this case, A6). Whenever two A-signals are swapped, the respective B-signals are also swapped, e.g. in the case described above, output assignments are changed such that b6 controls B'1 (in this case, B1), and b1 controls B'6 (in this case, B6). After this swap, the next element to be released from the B-position in a future actuation clock cycle, after C-subset 5 becomes full, is moving element 08 in C-subset 1, rather than moving element 30 in C-subset 6. A-signals are not swapped with B-signals, i.e. A-signals always control A-wires and B-signals always control B-wires. In the situation depicted in FIG. 24, there are two sets of A-signals whose members may be swapped with each other without disrupting the operation of the element selection method of FIGS. 15 to 23: {a0,a1,a6,a7} and {a3,a4}; and likewise for B-signals. Neither of a2, a5, b2 or b5 can be swapped with any other C-subset without disrupting the operation of the element selection method of FIGS. 15 to 23.

For sets of more than two R-signals that may be swapped, such as the set {r0,r1,r2,r3} in the example above, a controller according to certain embodiments of the present invention may select a pair of R-signals to be swapped, for example, using a pseudo-random number generator. Alternatively, the assignment of r0, r1, r2 and r3 to R'0, R'1, R'2, and R'3 may be scrambled by any other method such that each of r0, r1, r2 and r3 controls exactly one of the R-wires R'0, R'1, R'2, and R'3. Likewise, in the example above, the controller may select any pair of A-signals within the set {a0,a1,a6,a7} and the respective pair of B-signals for swapping, or it may change output assignments such that each of a0, a1, a6 and a7 controls exactly one of the A-wires A'0, A'1, A'6 and A'7, and each respective B-output controls the respective B-wire.

Typically, any two R-signals r(i) and r(j) may be swapped if, for all m where $0 \leq m < Nc$, the moving element at the intersection of the R-subset of R-wire R'(i) and C-subset m is in the same position and moving in the same direction (if in movement) as the moving element at the intersection of the R-subset of R'(j) and C-subset m.

Typically, any two A-signals a(i) and a(j) and respective B-signals b(i) and b(j) may be swapped if, for all m where $0 \leq m < Nr$, the moving element at the intersection of R-subset m and the C-subset of A-wire A'(i) and B-wire B'(i) is in the same position and moving in the same direction (if in movement) as the moving element at the intersection of R-subset m and the C-subset of A'(j) and B'(j).

With the element selection method of FIGS. 15 to 23, most C-subsets are either full or empty during any given clock cycle. As a result, if the element selection method of FIGS. 15 to 23 is used, any two A-signals a(i) and a(j) and respective B-signals b(i) and b(j) may be swapped if (using brackets to indicate the precedence of logical operators): either ($e<i<g$ and $e<j<g$), or (($i>e$ or $i<g$) and ($j>e$ or $j<g$)).

Improvements to the element selection method of FIGS. 15 to 23 to reduce addressing errors and improve transient response (e.g. enable the controller to release a larger number of moving elements at each actuation clock cycle) are now described. In FIG. 24, the maximum number of moving elements that the element selection method of FIGS. 15 to 23 can release from the A-position during the current actuation clock cycle is two (the elements numbered 16 and 17 in FIG. 24). Thus, if net_moves exceeds two, the addressing error during the current actuation clock cycle will be nonzero. Likewise, the maximum number of moving elements that the element selection method of FIGS. 15 to 23 can release from the B-position within a single actuation clock cycle in the situation of FIG. 24 is four (elements numbered 2C to 2F in FIG. 24), and thus, net_moves values below −4 will also produce nonzero addressing errors (of opposite polarity compared to the case where net_moves >2). In these cases, the addressing errors are a direct consequence of the fact that the element selection method of FIGS. 15 to 23 never releases moving elements within more than one C-subset in the same actuation clock cycle. By using improved versions of the element selection method of FIGS. 15 to 23 capable of releasing moving elements within more than one C-subset during a single actuation clock cycle, addressing errors may be eliminated in such cases. For example, if net_moves=6, exactly six moving elements may be released from the B-position by skipping to the next C-subset, applying 0V to B6 and to any six R-wires; or by applying 0V to R2-R5, B5 and B6 (selecting eight moving elements but taking advantage of the fact that moving elements 2A and 2B are already in the A-position). Alternatively, the same physical effect may be achieved by applying 0V to R4-R7, A2, B5 and B6, thereby simultaneously releasing eight moving elements (2C-2F and 34-37) from the B-position and two moving elements (16 and 17) from the A-position. Note however, that applying 0V to R0, R1, R4-R7, B5 and B6 would produce a different physical effect because a total of ten moving elements (2C-31 and 34-37) would be released, rather than six. Each of the possible solutions described above breaks the continuity of the A-set such that it no longer forms a continuous wraparound sequence. As a result, element selection methods which eliminate addressing errors in these situations are typically more complex than the element selection method of FIGS. 15 to 23. Such methods may, for example, split the A-set and B-set into S continuous wraparound sequences, and employ 4×5 internal variables analogous to d, e, f and g of the element selection method of FIGS. 15 to 23 to keep track of each continuous wraparound sequence. Alternatively, the number of continuous wraparound sequences may vary over time as appropriate to minimize addressing errors, or element selection methods may be devised which keep track of the position of each actuator element irrespective of any continuous wraparound sequences.

It is appreciated that situations may also occur where addressing errors are not due to limitations of a particular element selection method, but rather are inevitable regardless of the element selection method used. For example, in the actuator array of FIG. 24, if all moving elements are in the A-position, it is not possible to release exactly eleven moving elements during a single actuation clock cycle; generally, if the actuator array has Nr R-subsets and Nc C-subsets, it is not possible to release exactly P moving elements if P is a prime number larger than both Nr and Nc.

FIG. 25 shows the actuator array of FIG. 24, after the following array drive signals have been swapped e.g. as described with reference to FIG. 24:

R-signals r4 and r5
R-signals r6 and r7
A-signals a1 and a6
B-signals b1 and b6

All moving elements are in the same position as in FIG. 24. However, in FIG. 25, the next six moving elements to be released from the B-position are 2D, 2C, 2F, 2E, 08 and 09 (in this order), whereas in FIG. 24, the next six moving elements to be released from the B-position are 2C, 2D, 2E, 2F, 30 and 31.

Whereas in FIG. 24, R'(i) is R(i) for all i where 0≤i<Nr, and A'(j) is A(j) and B'(j) is B(j) for all j where 0≤j<Nc, this is no longer the case in FIG. 25. When array drive signals are swapped periodically at every actuation clock cycle, the assignment of array drive signals to R-wires, A-wires and B-wires becomes pseudo-random.

Figure 26:
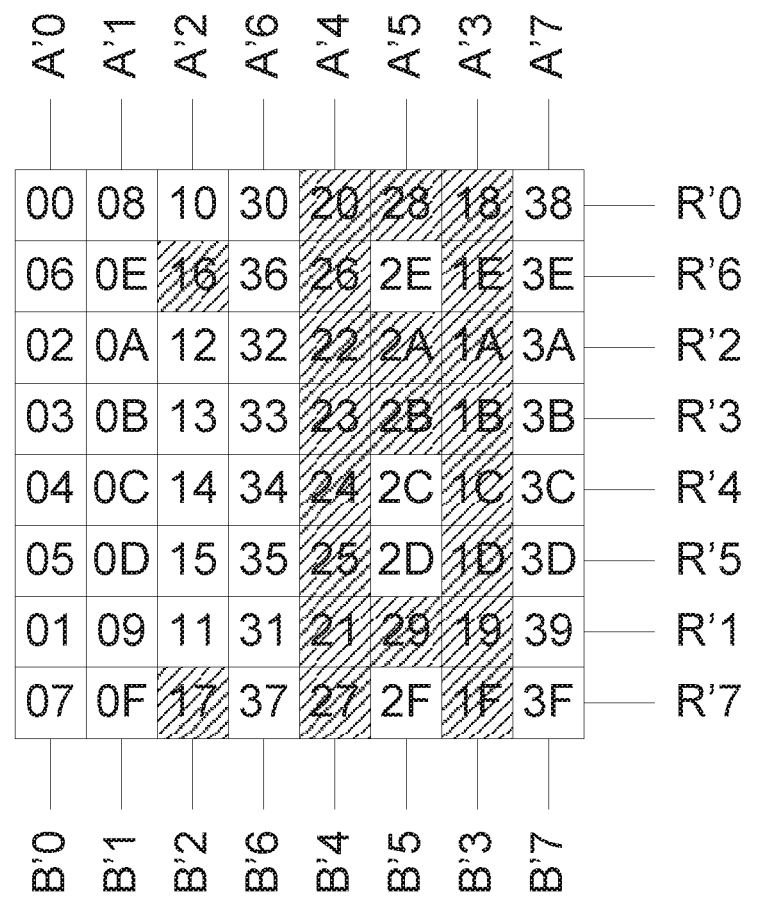

FIG. 26 shows the actuator array of FIG. 24, with many moving elements in a different position compared to FIG. 24.

Unlike in FIG. 24, the number in each square of FIG. 26 is the virtual element number of each moving element, defined in terms of the array drive signals currently controlling it:

virtual element number=Nr×A-signal number+R-signal number

It can be seen in FIG. 26 that, although the element numbers of the A-set do not form a continuous wraparound sequence as described with reference to FIG. 24, the virtual element numbers of the A-set do form a continuous wraparound sequence. Furthermore, the virtual element numbers of the A-set are the same in FIG. 26 as in FIG. 24. As a result, all the internal variables of the element selection method of FIGS. 15 to 23 (d, e, f and g, described previously with reference to FIGS. 15 to 23), have the same value in the situation of FIG. 26 and in that of FIG. 24. In effect, the two situations are identical as far as the operation of the element selection method of FIGS. 15 to 23 is concerned.

FIG. 27 is a simplified block diagram of an apparatus according to certain embodiments of the invention, comprising a controller 50 and actuator array 100. The controller 50 contains an element selector 550 and a high-voltage driver 560, whose function is described above with reference to FIG. 14. In the absence of addressing errors, the number of moving elements within actuator array 100 that are in the A-position equals the number represented by the input signal 601 of element selector 550. Element selector 550 is placed inside a noise shaping loop 60 which also comprises a loop filter 553, two adders 541 and 552, and an inverter (i.e. a digital multiplication by −1) 551. The element selector 550 generates an additional signal 651 representing the number of moving elements which actually are in the A-position (as opposed to signal 601 which represents the number of moving elements that should be in the A-position to produce the desired physical effect). The adder 552 and inverter 551 subtract this signal from the input signal 601 of element selector 550, generating an error signal 653 which represents the addressing error introduced by element selector 550. The loop filter 553 filters the error signal 652 and the resulting filtered error signal 653 is added to the loop input signal 600 to generate the input signal 601 for the element selector 550.

Assuming that the addressing error is not correlated with the input signal 600, the signal transfer function (STF) of the loop is one, while its noise transfer function (NTF) is given by:

$$NTF=1-H_e[z]$$

where $H_e[z]$ is the impulse response of loop filter 61 in the z-domain. By designing a loop filter with a suitable $H_e[z]$, a NTF can be obtained which has a high gain in a frequency band of interest ("in-band gain") and a low gain outside this frequency band ("out-of-band gain"). As a result, the frequency spectrum of addressing noise (resulting from addressing errors) is shaped such that the physical effect produced by actuator array 100 contains less addressing noise in the frequency band of interest resulting than it would without the noise shaping loop 60.

Similar noise shaping loops are known in the art for shaping the frequency spectrum of quantization noise, e.g. in digital-to-analog converters (DACs) and analog-to-digital converters (ADCs), and are commonly referred to as "sigma-delta modulators" and "delta-sigma modulators". Methods for designing loop filters for conventional sigma-delta modulators are known in the art.

Design goals for loop filters, both in conventional sigma-delta modulators and in addressing-noise shaping loops according to certain embodiments of the present invention, typically include obtaining a desired NTF, and ensuring that the noise-shaping loop is either unconditionally stable (i.e. not producing oscillations not present in the input signal, which is generally undesirable), or stable under specific conditions. Conventional methods for predicting the NTF as a function of the loop filter's impulse response, or for finding a loop filter response to approximate a desired NTF, may also be used for addressing-noise shaping loops according to certain embodiments of the present invention.

However, conventional methods for predicting whether a conventional sigma-delta modulator is stable, or for choosing the loop filter's impulse response to ensure stability, are not necessarily suitable for addressing-noise shaping loops according to certain embodiments of the present invention. The stability of addressing-noise shaping loops according to certain embodiments of the present invention depends on the element selection method used. For example, the element selection method of FIGS. 15 to 23 described previously with reference to FIGS. 15 to 23 enters a repetitive two-cycle pattern if the input signal has a high slew rate, producing oscillations at half the actuation clock frequency. Adding an addressing-noise shaping loop may cause such oscillations to persist longer than in a similar apparatus without a noise-shaping loop. As a result, addressing-noise shaping loops wherein the element selector uses the element selection method of FIGS. 15 to 23 become unstable relatively easily. With other element selection methods, such as the variations on the element selection method of FIGS. 15 to 23 described with reference to FIG. 24, the loop may remain stable for a wider range of input signals.

Furthermore, the stability of addressing-noise shaping loops according to the present may also depend on the degree of correlation between the addressing error and the input signal. As noted above, addressing-noise shaping loops according to certain embodiments of the present invention assume there is no such correlation. Likewise, conventional sigma-delta modulators rely on an assumption that quantization error is not correlated with the input signal. In fact, both types of errors typically exhibit a degree of correlation with the input signal. Both conventional sigma-delta modulators and addressing-noise shaping loops according to certain embodiments of the present invention assume the respective correlation to be low enough to be negligible. However, depending on the element selection method used, the degree of correlation between addressing error and input signal in an addressing-noise shaping loop according to certain embodiments of the present invention may be higher than the correlation between quantization noise and input signal in a conventional sigma-delta modulator.

Generally, the stability of addressing-noise shaping loops according to certain embodiments of the present invention depends on both the loop filter's impulse response and the element selection method used. For specific input signals, loop stability may be verified by simulating the entire noise-shaping loop, e.g. in a software package such as MATLAB. For a given element selection method, the loop is more likely to be stable if the loop filter 553 has a short, smooth impulse response. For example, if the loop filter 553 is a finite impulse response (FIR) filter with a transfer function given in the z-domain as $b0+b1z^{-1}+b2z^{-2}+b3z^{-3}+\ldots+b(n)z^{-n}$, the loop is more likely to be stable if n is low and $|b(i)-b(i+1)|$ is low for $0 \leq i < n$. As an example, an addressing-noise shaping loop according to certain embodiments of the present invention may be stable for a specific input signal when using a loop filter with the impulse response $0.5z^{-1}+0.5z^{-2}$, and unstable for the same input signal when using a loop filter with the impulse response $z^{-1}+0z^{-2}$.

Various different topologies of noise shaping loops are known in the art. While the example of FIG. 27 shows a topology known as "error feedback", this is an example only and any other loop topology may be used. Noise shaping loop topologies known in the art include, without limitation: "single feedback", topologies using feed-forward instead of or in addition to feedback, cascaded and multi-stage topologies.

FIG. 27 assumes that the noise shaping loop 60 includes a delay of at least one actuation clock cycle. For example, if the error signal 653 does not already include a delay, and loop filter 553 is a finite impulse response (FIR) filter with a transfer function given in the z-domain as $b0+b1z^{-1}+b2z^{-2}+b3z^{-3}+\ldots+b(n)z^{-n}$, then b0 is typically zero. Alternatively, the delay may be a natural by-product of, or a deliberate addition to, some or all of element selector 550, inverter 551, and/or adder 552.

The loop filter and hence NTF may be of any order and may have any characteristic, such as lowpass, bandpass or highpass.

The signal transfer function (STF) may be one. Alternatively, depending on the application, a STF with non-flat frequency response may be desirable, and/or its effect may be cancelled by other system components with a non-flat frequency response. Noise shaping loop architectures with non-flat STFs are well known in the art.

In all text referring to FIG. 27 onward, the word "A-position" may be replaced with "B-position" without fundamentally altering operation of the apparatus.

A controller according to certain embodiments of the present invention may include a noise-shaping loop as shown in FIG. 27 and subsequent Figures e.g. in conjunction with one or more of the low-pass filter, sample-rate converter, scaler and quantizer described with reference to FIG. 14.

FIG. 28 is a simplified block diagram of another embodiment of the invention, analogous to that of FIG. 27, but with noise shaping applied to quantization noise as well as addressing noise. The use of a quantizer within the present invention has been described previously with reference to FIG. 14. Quantization noise, or quantization error, refers to the difference between the quantizer's input and its output. In FIG. 28, error signal 658 represents the sum of quantization error and addressing error (whereas error signal 653 in FIG. 27 represents addressing error only), and therefore the noise transfer function (NTF) of noise shaping loop 60 is applied to quantization noise and addressing noise (as opposed to addressing noise only as in FIG. 27). As a result, input signal 70 can be reproduced more accurately and/or with a lower number of actuator elements than would be possible without quantization noise shaping.

FIG. 29 is a simplified block diagram of a further embodiment of the invention. As in FIGS. 27 and 28, the apparatus includes a controller 50 and actuator array 100, with the controller 50 featuring a noise shaping loop 60. Noise shaping is applied to quantization noise and addressing noise. However, in contrast to FIG. 28 where a single loop filter is used for both types of noise, in FIG. 29 the two types of noise are processed separately. The adder 542 and inverter 541 together subtract the quantized signal 640 from the quantizer's input signal 603, thereby producing signal 642 which represents quantization error. This is filtered by a first loop filter 543 to produce filtered quantization noise signal 643, which is added to input signal 600 by adder 535. Likewise, adder 552 and inverter 551 together subtract the actual number of moving elements in the A-position, represented by signal 651, from the desired number of moving elements in the A-position represented by the quantized signal 640, producing signal 652 which represents addressing error. This is filtered by a second loop filter 553 to produce a filtered addressing noise signal 653, which is added to the input signal 600 along with the filtered quantization noise signal 643.

The characteristics of addressing noise may differ from those of quantization noise in any or all of the following ways:

Addressing noise may have higher peak amplitudes than quantization noise, which is limited to a narrow range of values (typically ±0.5 least significant bits if the quantizer does not use dithering, although the range may be wider with dither).

The spectra of the types of noise may differ. For example, quantization noise may be shaped in the quantizer, by using dither with a triangular probability function, as described with reference to FIG. 14. This results in quantization noise energy already being concentrated primarily at high frequencies in the signal prior to entering the noise-shaping loop. This technique well known in the art, e.g. in the field of delta-sigma data converters. Applying the same technique to addressing noise may make the addressing-noise shaping loop unstable as described with reference to FIG. 27, and may therefore be undesirable.

As described with reference to FIG. 27, addressing noise may exhibit a higher degree of correlation with the input signal 70 than quantization noise does, thus a loop filter with a short, smooth impulse response may be provided to maintain loop stability, as opposed to quantization noise where a longer, less smooth impulse response may be provided.

The use of two separate loop filters 543 and 553, for quantization noise and addressing noise respectively, makes it possible to combine aggressive quantization noise shaping, e.g. using a finite impulse response (FIR) filter with a relatively long impulse response for loop filter 543, with more conservative shaping of addressing noise, e.g. using a FIR with a shorter impulse response for loop filter 553. More generally, different NTFs can be implemented for each type of noise to suit the needs of the application.

The individual addressing methods and apparatus shown and described herein are particularly useful for arrays of double-sided electrostatic actuators. The noise reduction methods and apparatus shown and described herein are useful in a wide variety of arrays such as but not limited to the arrays shown and described herein.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order.

Any or all of computerized sensors, output devices or displays, processors, data storage and networks may be used as appropriate to implement any of the methods and apparatus shown and described herein.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

What is claimed is:

1. A method for controlling an apparatus for generating sound, at least one attribute of which corresponds to at least one characteristic of a digital input signal sampled periodically, the apparatus comprising:
   a multiplicity of electrostatic actuator elements, each comprising a moving element moving between first and second electrodes, the multiplicity of electrostatic actuator elements including Nr first subsets (R-subsets) of actuator elements and Nc second subsets (C-subsets) of actuator elements, wherein a first partitioning of the multiplicity of actuator elements yields the Nr first subsets (R-subsets) and a second partitioning of the multiplicity of actuator elements yields the Nc second subsets (C-subsets);
   a first plurality of Nr electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset;
   a second plurality of Nc electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset;
   a third plurality of Nc electrical connections (B-wires) interconnecting the second electrodes of actuator elements in each C-subset, such that the second electrode of any actuator element in each individual C-subset is electrically connected to the second electrode of all other actuator elements in said individual C-subset, and electrically isolated from all actuator elements not in said individual C-subset;
   the method comprising applying one of a predetermined, finite set of electric potentials to each of said electrical connections respectively, wherein at least part of said set of electric potentials comprises a first value in at least a first phase and a second value in at least a second phase, such that resulting movements of the moving elements produce the sound.

2. The method of claim 1, comprising moving moving elements of actuator elements in opposite directions, said actuator elements being in the same first subset (R-subset) but in different second subsets (C-subsets).

3. The method of claim 1, comprising moving two sets of moving elements of actuator elements, such that a first set of actuator elements is in the first phase, while the second set of actuator elements is in the second phase.

4. The method of claim 3, wherein:
   the two actuator elements are not in the same first subset (R-subset), and
   if the two moving elements are moving in opposite directions, the actuators elements are in different second subsets (C-subsets).

5. The method of claim 1, comprising moving a selected moving element from one extreme position to another extreme position, wherein at least one of a voltage applied to the electrical connections (R-voltage $V_{RS}$), a voltage applied to the electrical connections connected to an electrode from which the selected moving element is to be released (C-voltage $V_{CR}$), and a voltage applied to the electrical connections connected to an electrode to which the selected moving element is to be latched (C-voltage $V_{CL}$), varies between a first phase and a second phase.

6. The method of claim 1, wherein at least part of said set of electric potentials comprises values for each of a plurality of k phases, with k a positive integer.

7. An apparatus for generating sound, at least one attribute of which corresponds to at least one characteristic of a digital input signal sampled periodically, the apparatus comprising:
   a multiplicity of electrostatic actuator elements, each comprising a moving element moving between first and second electrodes, the multiplicity of electrostatic actuator elements including Nr first subsets (R-subsets) of actuator elements and Nc second subsets (C-subsets) of actuator elements, wherein a first partitioning of the multiplicity of actuator elements yields the Nr first subsets (R-subsets) and a second partitioning of the multiplicity of actuator elements yields the Nc second subsets (C-subsets);
   a first plurality of Nr electrical connections (R-wires) interconnecting the moving elements of actuator elements in each R-subset, such that the moving element of any actuator element in each individual R-subset is electrically connected to the moving elements of all other actuator elements in the individual R-subset, and electrically isolated from the moving elements of all actuator elements not in the individual R-subset;
   a second plurality of Nc electrical connections (A-wires) interconnecting the first electrodes of actuator elements in each C-subset, such that the first electrode of any actuator element in each individual C-subset is electrically connected to the first electrode of all other actuator elements in the individual C-subset, and electrically isolated from all actuator elements not in the individual C-subset;
   a third plurality of Nc electrical connections (B-wires) interconnecting the second electrodes of actuator elements in each C-subset, such that the second electrode of any actuator element in each individual C-subset is electrically connected to the second electrode of all other actuator elements in said individual C-subset, and electrically isolated from all actuator elements not in said individual C-subset;

a controller electrically connected to said first, second and third pluralities of electrical connections, operative to receive a digital input signal, and to apply one of a predetermined, finite set of electric potentials to each of said electrical connections respectively, wherein at least part of said set of electric potentials comprises a first value in at least a first phase and a second value in at least a second phase, such that resulting movements of the moving elements produce the sound.

8. The apparatus of claim 7, further configured to move moving elements of actuator elements in opposite directions, said actuator elements being in the same first subset (R-subset) but in different second subsets (C-subsets).

9. The apparatus of claim 7, further configured to move two sets of moving elements of actuator elements, such that a first set of actuator elements is in the first phase, while the second set of actuator elements is in the second phase.

10. The apparatus of claim 9, wherein:
the two actuator elements are not in the same first subset (R-subset), and
if the two moving elements are moving in opposite directions, the actuators elements are in different second subsets (C-subsets).

11. The apparatus of claim 7, further configured to move a selected moving element from one extreme position to another extreme position, wherein at least one of a voltage applied to the electrical connections (R-voltage $V_{RS}$), a voltage applied to the electrical connections connected to an electrode from which the selected moving element is to be released (C-voltage $V_{CR}$), and a voltage applied to the electrical connections connected to an electrode to which the selected moving element is to be latched (C-voltage $V_{CL}$), varies between a first phase and a second phase.

12. The apparatus of claim 7, wherein at least part of said set of electric potentials comprises values for each of a plurality of k phases, with k a positive integer.

* * * * *